United States Patent
Yao et al.

(10) Patent No.: US 9,817,513 B2
(45) Date of Patent: Nov. 14, 2017

(54) SENSE AMPLIFIER STABILIZATION WITH SWITCHED SERIES RESISTOR

(71) Applicant: Apple Inc., Cupertino, CA (US)

(72) Inventors: Weijun Yao, San Jose, CA (US); Wei Hsin Yao, Palo Alto, CA (US); Yingxuan Li, Saratoga, CA (US)

(73) Assignee: Apple Inc., Cupertino, CA (US)

( * ) Notice: Subject to any disclaimer, the term of this patent is extended or adjusted under 35 U.S.C. 154(b) by 273 days.

(21) Appl. No.: 14/606,996

(22) Filed: Jan. 27, 2015

(65) Prior Publication Data

US 2016/0216836 A1   Jul. 28, 2016

(51) Int. Cl.
*G06F 3/041* (2006.01)
*G06F 3/044* (2006.01)

(52) U.S. Cl.
CPC ............ *G06F 3/0418* (2013.01); *G06F 3/044* (2013.01); *G06F 3/0416* (2013.01)

(58) Field of Classification Search
CPC ...... G06F 3/044; G06F 3/0416; G06F 3/0412; G06F 3/041; G06F 3/0488; G06F 3/04883; G06F 3/0235; G06F 3/04815; G06F 3/04845; G06F 3/03545; G06F 3/0485; G06F 3/04886; G06F 3/03547; G06F 3/0418; G06F 2203/04104; G06F 2203/04101; G06F 2203/04808; G06F 2203/04106; G06F 2203/04112; G06F 2203/04111; G06F 2203/04108; G02F 1/13338; G02F 1/134363; G02F 1/136286;

(Continued)

(56) References Cited

U.S. PATENT DOCUMENTS

| 4,336,505 A * | 6/1982 | Meyer ........................ H03L 7/02 331/1 R |
| 5,483,261 A | 1/1996 | Yasutake |
| 5,488,204 A | 1/1996 | Mead et al. |

(Continued)

FOREIGN PATENT DOCUMENTS

| JP | 2000-163031 A | 6/2000 |
| JP | 2002-342033 A | 11/2002 |

OTHER PUBLICATIONS

Lee, S.K. et al. (Apr. 1985). "A Multi-Touch Three Dimensional Touch-Sensitive Tablet," *Proceedings of CHI: ACM Conference on Human Factors in Computing Systems*, pp. 21-25.

(Continued)

*Primary Examiner* — Nalini Mummalaneni
(74) *Attorney, Agent, or Firm* — Morrison & Foerster LLP

(57) ABSTRACT

A sense amplifier can be designed with a series variable resistance circuit to dynamically adjust an input resistance in series with the sense amplifier for stability during the different operating modes. In some examples, a switchable resistor can be switched into the input path of the sense amplifier for stability when required by increased capacitive loading of the sense electrodes, and can be switched out of the input path of the sense amplifier when unnecessary for stability. In some examples, an adjustable resistor can be coupled to and in series with the input of the sense amplifier. The resistance of the adjustable resistor can be tuned to stabilize the sense amplifier during operating modes having increased capacitive loading from the sense electrodes and can be minimized when additional input resistance is unnecessary for stability.

25 Claims, 11 Drawing Sheets

(58) Field of Classification Search
CPC ............. H03K 17/9622; H03K 17/962; H03K 17/955; H03K 2217/960725
See application file for complete search history.

(56) References Cited

U.S. PATENT DOCUMENTS

| | | | |
|---|---|---|---|
| 5,825,352 | A | 10/1998 | Bisset et al. |
| 5,835,079 | A | 11/1998 | Shieh |
| 5,880,411 | A | 3/1999 | Gillespie et al. |
| 5,903,504 | A * | 5/1999 | Chevallier ............. G11C 5/143 |
| | | | 365/189.07 |
| 6,188,391 | B1 | 2/2001 | Seely et al. |
| 6,310,610 | B1 | 10/2001 | Beaton et al. |
| 6,323,846 | B1 | 11/2001 | Westerman et al. |
| 6,690,387 | B2 | 2/2004 | Zimmerman et al. |
| 7,015,894 | B2 | 3/2006 | Morohoshi |
| 7,184,064 | B2 | 2/2007 | Zimmerman et al. |
| 7,663,607 | B2 | 2/2010 | Hotelling et al. |
| 8,031,094 | B2 | 10/2011 | Hotelling et al. |
| 8,411,066 | B2 | 4/2013 | Cordeiro et al. |
| 8,479,122 | B2 | 7/2013 | Hotelling et al. |
| 8,482,545 | B2 | 7/2013 | King-Smith et al. |
| 2005/0110559 | A1* | 5/2005 | Farkas ................... H02M 3/07 |
| | | | 327/536 |
| 2006/0197753 | A1 | 9/2006 | Hotelling |
| 2006/0279548 | A1 | 12/2006 | Geaghan |
| 2007/0257890 | A1* | 11/2007 | Hotelling ............. G06F 3/0418 |
| | | | 345/173 |
| 2011/0061949 | A1* | 3/2011 | Krah ..................... G06F 3/0418 |
| | | | 178/18.06 |
| 2012/0050216 | A1* | 3/2012 | Kremin ................... G06F 3/044 |
| | | | 345/174 |
| 2013/0076648 | A1 | 3/2013 | Krah et al. |
| 2014/0015746 | A1* | 1/2014 | Hargreaves ............. G06F 3/044 |
| | | | 345/157 |
| 2014/0267129 | A1* | 9/2014 | Rebeschi ............. G06F 3/0418 |
| | | | 345/174 |

OTHER PUBLICATIONS

Rubine, D.H. (Dec. 1991). "The Automatic Recognition of Gestures," CMU-CS-91-202, Submitted in Partial Fulfillment of the Requirements for the Degree of Doctor of Philosophy in Computer Science at Carnegie Mellon University, 285 pages.

Rubine, D.H. (May 1992). "Combining Gestures and Direct Manipulation," CHI '92, pp. 659-660.

Westerman, W. (Spring 1999). "Hand Tracking, Finger Identification, and Chordic Manipulation on a Multi-Touch Surface," A Dissertation Submitted to the Faculty of the University of Delaware in Partial Fulfillment of the Requirements for the Degree of Doctor of Philosophy in Electrical Engineering, 364 pages.

* cited by examiner

SENSE AMPLIFIER STABILIZATION WITH SWITCHED SERIES RESISTOR

FIELD OF THE DISCLOSURE

This relates generally to touch sensor panels in which a self-capacitance touch sensor is utilized to detect the presence of an object in contact with or in close proximity to a touch sensor panel, and more particularly, to stabilizing a sense amplifier with a series resistance for a touch sensor panel with a self-capacitance touch sensor.

BACKGROUND OF THE DISCLOSURE

Many types of input devices are presently available for performing operations in a computing system, such as buttons or keys, mice, trackballs, joysticks, touch sensor panels, touch screens and the like. Touch screens, in particular, are becoming increasingly popular because of their ease and versatility of operation as well as their declining price. Touch screens can include a touch sensor panel, which can be a clear panel with a touch-sensitive surface, and a display device such as a liquid crystal display (LCD) that can be positioned partially or fully behind the panel so that the touch-sensitive surface can cover at least a portion of the viewable area of the display device. Touch screens can allow a user to perform various functions by touching the touch sensor panel using a finger, stylus or other object at a location often dictated by a user interface (UI) being displayed by the display device. In general, touch screens can recognize a touch and the position of the touch on the touch sensor panel, and the computing system can then interpret the touch in accordance with the display appearing at the time of the touch, and thereafter can perform one or more actions based on the touch. In the case of some touch sensing systems, a physical touch on the display is not needed to detect a touch. For example, in some capacitive-type touch sensing systems, fringing electrical fields used to detect touch can extend beyond the surface of the display, and objects approaching near the surface may be detected near the surface without actually touching the surface.

In some capacitive-type touch sensing systems, sense amplifiers can be used to detect capacitive effects at electrodes of the touch sensor panel or touch screen. The sense amplifiers can be designed with a suitable feedback network for stability during capacitive scanning operation.

SUMMARY OF THE DISCLOSURE

Some capacitive touch sensor panels can operate in different scanning modes resulting in different input capacitive loading from sense electrodes. A sense amplifier can be designed with a series variable resistance circuit to dynamically adjust an input resistance in series with the sense amplifier for stability during the different operating modes. In some examples, a switchable resistor can be switched into the input path of the sense amplifier for stability when required by increased capacitive loading of the sense electrodes, and can be switched out of the input path of the sense amplifier when unnecessary for stability (e.g., a reduced capacitive loading relative to the coarse scan). In some examples, an adjustable resistor can be coupled to and in series with the input of the sense amplifier. The resistance of the adjustable resistor can be tuned to stabilize the sense amplifier during operating modes having increased capacitive loading from the sense electrodes and can be minimized when additional input resistance is unnecessary for stability.

DETAILED DESCRIPTION

In the following description of examples, reference is made to the accompanying drawings which form a part hereof, and in which it is shown by way of illustration specific examples that can be practiced. It is to be understood that other examples can be used and structural changes can be made without departing from the scope of the disclosed examples.

Some capacitive touch sensor panels can operate in different scanning modes resulting in different input capacitive loading from sense electrodes. For example, a pixelated self-capacitance touch sensor panel can operate in two modes: a coarse scan and a fine scan. During the coarse scan (e.g., common mode super-pixel scan), the touch system can sense self-capacitance at a plurality of super-pixel electrodes to identify a coarse location of an object touching or proximate to the surface of the touch sensor panel. Super pixel electrodes can be formed by coupling together groups of individual touch pixel electrodes. During the fine scan (e.g., per-pixel scan, row scan or column scan), the touch system can sense self-capacitance of selected individual pixel electrodes or selected small groups (relative to the super-pixel electrodes) of pixels forming rows or columns proximate to the coarse location identified during the coarse scan to identify a fine location of the object touching or proximate to the surface of the touch sensor panel.

The capacitive loading of multiple electrodes coupled to a sense channel during a common mode coarse scanning operation can destabilize a sense amplifier in a sense channel designed for stability during a fine scanning operation (which can sense fewer electrodes, and thereby can have a reduced capacitive loading). In order to address the different loading conditions at the input of a sense channel, a sense amplifier can be designed to include a dynamically adjustable input resistance (i.e., variable resistance circuit) in series with the sense amplifier. The input resistance can be adjusted to stabilize the sense amplifier during the different operating modes. In some examples, a switchable resistor can be switched into the input path of the sense amplifier for stability when required by increased capacitive loading of the sense electrodes, and can be switched out of the input path of the sense amplifier when unnecessary for stability (e.g., a reduced capacitive loading relative to the coarse scan). In some examples, an adjustable resistor can be coupled to and in series with the input of the sense amplifier. The resistance of the adjustable resistor can be tuned to stabilize the sense amplifier during operating modes having increased capacitive loading from the sense electrodes and can be minimized when additional input resistance is unnecessary for stability.

Figure 1A:
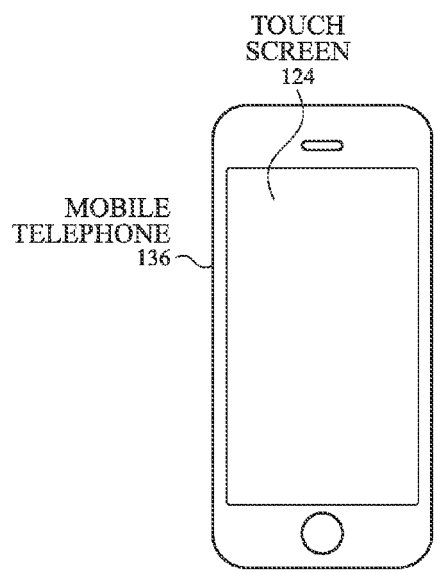
FIGS. 1A-1D illustrate example systems in which a touch screen according to examples of the disclosure may be implemented.
Figure 1B:
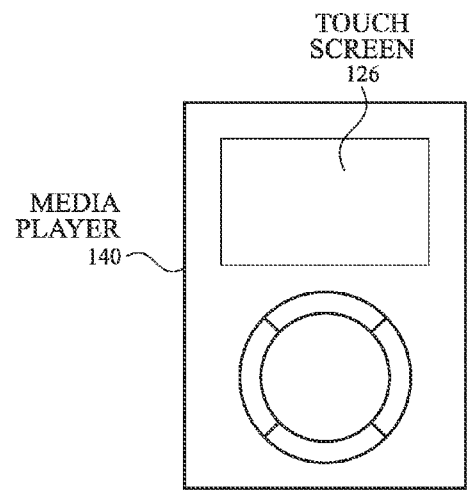
Figure 1C:
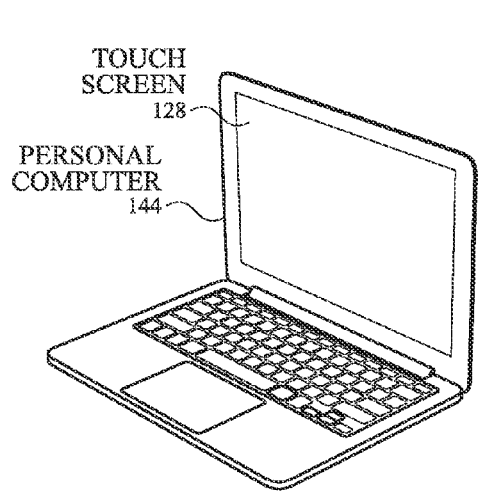
Figure 1D:
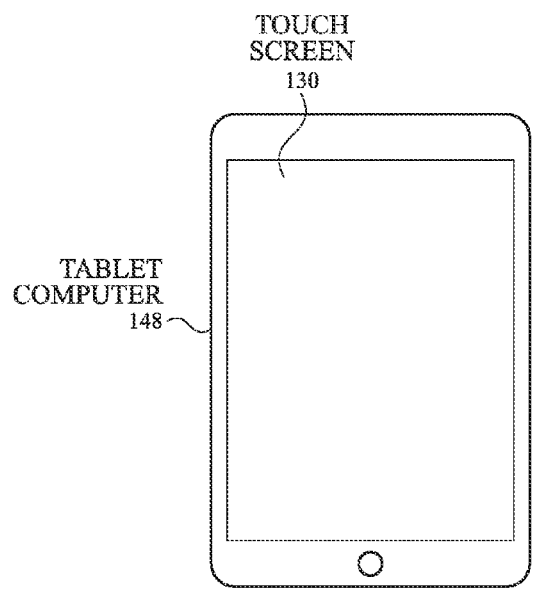

FIGS. 1A-1D illustrate example systems in which a touch screen according to examples of the disclosure may be implemented. FIG. 1A illustrates an example mobile telephone 136 that includes a touch screen 124. FIG. 1B illustrates an example digital media player 140 that includes a touch screen 126. FIG. 1C illustrates an example portable computing device 144 that includes a touch screen 128. FIG. 1D illustrates an example tablet computing device 148 that includes a touch screen 130. Touch screens 124, 126, 128 and 130 can be based on self-capacitance. A self-capacitance based touch system can include a matrix of small, individual plates of conductive material that can be referred to as touch pixel electrodes (as described below with reference to touch screen 220 in FIG. 2). For example, a touch screen can include a plurality of individual touch pixel electrodes, each touch pixel electrode identifying or representing a unique location on the touch screen at which touch or proximity (i.e., a touch or proximity event) is to be sensed, and each touch pixel electrode being electrically isolated from the other touch pixel electrodes in the touch screen/panel. Such a touch screen can be referred to as a pixelated self-capacitance touch screen. During operation, a touch pixel electrode can be stimulated with an alternating current (AC) waveform, and the self-capacitance to ground of the touch pixel electrode can be measured. As an object approaches the touch pixel electrode, the self-capacitance to ground of the touch pixel electrode can change. This change in the self-capacitance of the touch pixel electrode can be detected and measured by the touch sensing system to determine the positions of multiple objects when they touch, or come in proximity to, the touch screen. In some examples, the electrodes of a self-capacitance based touch system can be formed from rows and columns of conductive material, and changes in the self-capacitance to ground of the rows and columns can be detected, similar to above. In some examples, a touch screen can be multi-touch, single touch, projection scan, full-imaging multi-touch, capacitive touch, etc.

Figure 2:
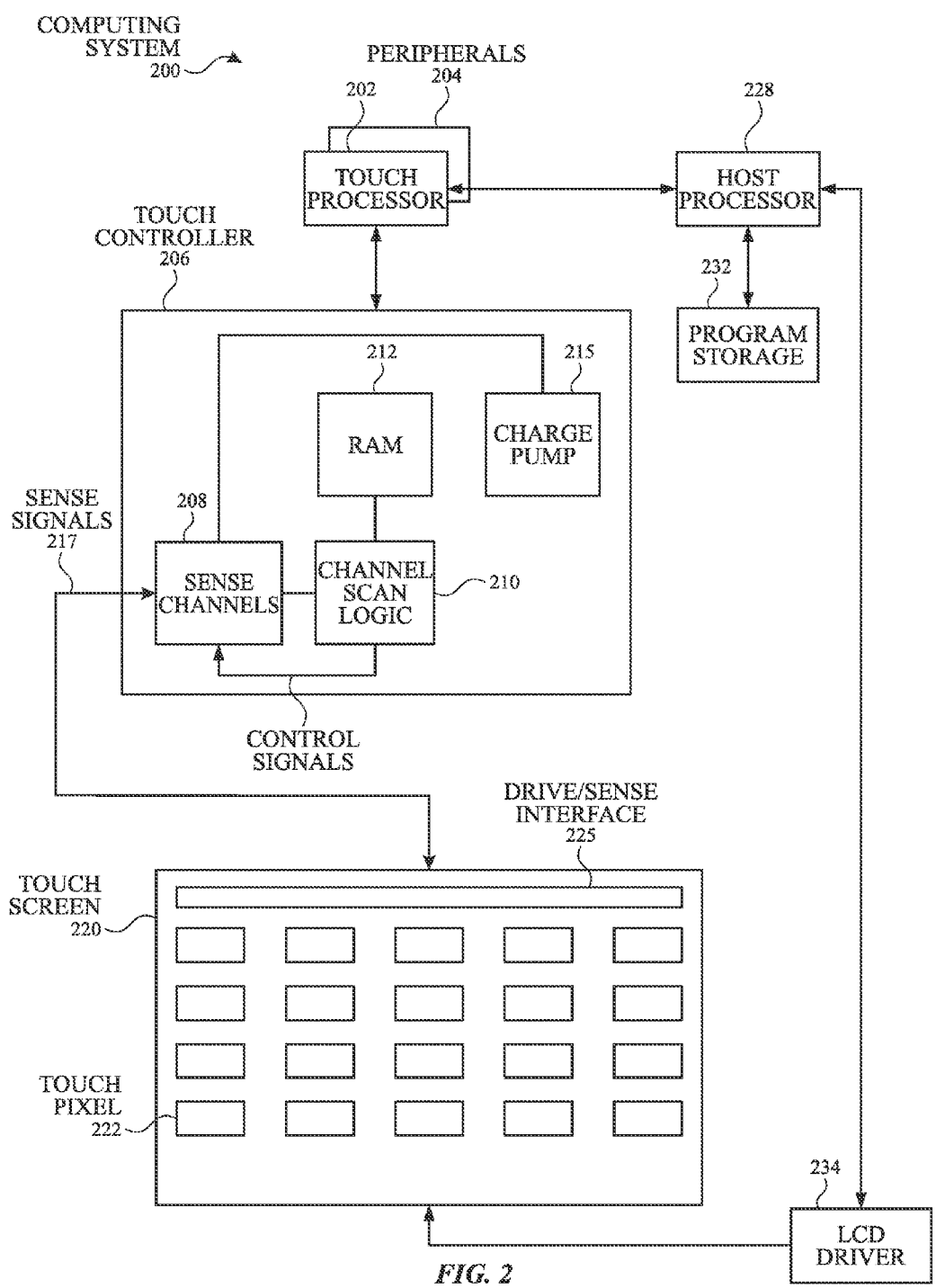
FIG. 2 is a block diagram of an example computing system that illustrates one implementation of an example touch screen according to examples of the disclosure.

FIG. 2 is a block diagram of an example computing system 200 that illustrates one implementation of an example touch screen 220 according to examples of the disclosure. Computing system 200 can be included in, for example, mobile telephone 136, digital media player 140, portable computing device 144, tablet computing device 148, or any mobile or non-mobile computing device that includes a touch screen, including a wearable device. Computing system 200 can include a touch sensing system including one or more touch processors 202, peripherals 204, a touch controller 206, and touch sensing circuitry (described in more detail below). Peripherals 204 can include, but are not limited to, random access memory (RAM) or other types of memory or storage, watchdog timers and the like. Touch controller 206 can include, but is not limited to, one or more sense channels 208 and channel scan logic 210. Channel scan logic 210 can access RAM 212, autonomously read data from sense channels 208 and provide control for the sense channels. In addition, channel scan logic 210 can control sense channels 208 to generate stimulation signals at various frequencies and phases that can be selectively applied to the touch pixels of touch screen 220, as described in more detail below. In some examples, touch controller 206, touch processor 202 and peripherals 204 can be integrated into a single application specific integrated circuit (ASIC), and in some examples can be integrated with touch screen 220 itself.

Touch screen 220 can include touch sensing circuitry that can include a capacitive sensing medium having a plurality of electrically isolated touch pixel electrodes 222 (e.g., a pixelated self-capacitance touch screen). Touch pixel electrodes 222 can be coupled to sense channels 208 in touch controller 206, can be driven by stimulation signals from the sense channels through drive/sense interface 225, and can be sensed by the sense channels through the drive/sense interface as well, as described above. Labeling the conductive plates used to detect touch (i.e., touch pixel electrodes 222) as "touch pixel" electrodes can be particularly useful when touch screen 220 is viewed as capturing an "image" of touch. In other words, after touch controller 206 has determined an amount of touch detected at each touch pixel electrode 222 in touch screen 220, the pattern of touch pixel electrodes in the touch screen at which a touch occurred can be thought of as an "image" of touch (e.g., a pattern of fingers touching the touch screen).

Computing system 200 can also include a host processor 228 for receiving outputs from touch processor 202 and performing actions based on the outputs. For example, host processor 228 can be connected to program storage 232 and a display controller, such as an LCD driver 234. The LCD driver 234 can provide voltages on select (gate) lines to each pixel transistor and can provide data signals along data lines to these same transistors to control the pixel display image as described in more detail below. Host processor 228 can use LCD driver 234 to generate an image on touch screen 220, such as an image of a user interface (UI), and can use touch processor 202 and touch controller 206 to detect a touch on or near touch screen 220. The touch input can be used by computer programs stored in program storage 232 to perform actions that can include, but are not limited to, moving an object such as a cursor or pointer, scrolling or panning, adjusting control settings, opening a file or document, viewing a menu, making a selection, executing instructions, operating a peripheral device connected to the host device, answering a telephone call, placing a telephone call, terminating a telephone call, changing the volume or audio settings, storing information related to telephone communications such as addresses, frequently dialed numbers, received calls, missed calls, logging onto a computer or a computer network, permitting authorized individuals access to restricted areas of the computer or computer network, loading a user profile associated with a user's preferred arrangement of the computer desktop, permitting access to web content, launching a particular program, encrypting or decoding a message, and/or the like. Host processor 228 can also perform additional functions that may not be related to touch processing.

Note that one or more of the functions described above, including the configuration of switches, can be performed by firmware stored in memory (e.g., one of the peripherals 204 in FIG. 2) and executed by touch processor 202, or stored in program storage 232 and executed by host processor 228. The firmware can also be stored and/or transported within any non-transitory computer-readable storage medium for use by or in connection with an instruction execution system, apparatus, or device, such as a computer-based system, processor-containing system, or other system that can fetch the instructions from the instruction execution system, apparatus, or device and execute the instructions. In the context of this document, a "non-transitory computer-readable storage medium" can be any medium (excluding signals) that can contain or store the program for use by or in connection with the instruction execution system, apparatus, or device. The computer-readable storage medium can include, but is not limited to, an electronic, magnetic, optical, electromagnetic, infrared, or semiconductor system, apparatus or device, a portable computer diskette (magnetic), a random access memory (RAM) (magnetic), a read-only memory (ROM) (magnetic), an erasable programmable read-only memory (EPROM) (magnetic), a portable optical disc such a CD, CD-R, CD-RW, DVD, DVD-R, or DVD-RW, or flash memory such as compact flash cards, secured digital cards, Universal Serial Bus (USB) memory devices, memory sticks, and the like.

The firmware can also be propagated within any transport medium for use by or in connection with an instruction execution system, apparatus, or device, such as a computer-based system, processor-containing system, or other system that can fetch the instructions from the instruction execution system, apparatus, or device and execute the instructions. In the context of this document, a "transport medium" can be any medium that can communicate, propagate or transport the program for use by or in connection with the instruction execution system, apparatus, or device. The transport medium can include, but is not limited to, an electronic, magnetic, optical, electromagnetic or infrared wired or wireless propagation medium.

Figure 3:
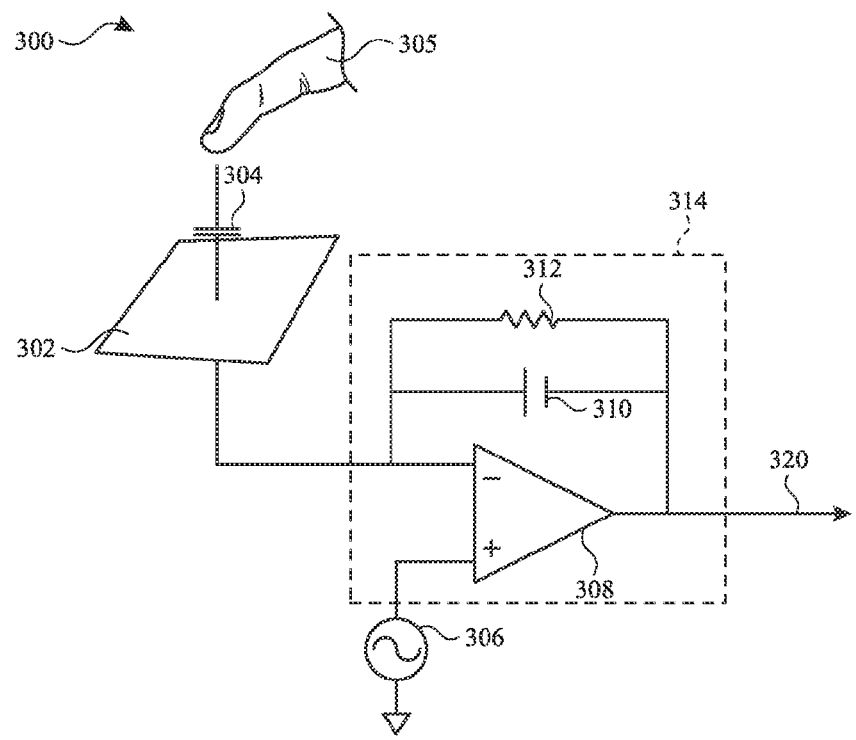
FIG. 3 illustrates an example touch sensor circuit corresponding to a self-capacitance touch pixel electrode and sensing circuit according to examples of the disclosure.

FIG. 3 illustrates an example touch sensor circuit 300 corresponding to a self-capacitance touch pixel electrode 302 and sensing circuit 314 according to examples of the disclosure. Touch pixel electrode 302 can correspond to touch pixel electrode 222. Touch pixel electrode 302 can have an inherent self-capacitance to ground associated with it, and also an additional self-capacitance to ground that is formed when an object, such as finger 305, is in proximity to or touching the electrode. The total self-capacitance to ground of touch pixel electrode 302 can be illustrated as capacitance 304. Touch pixel electrode 302 can be coupled to sensing circuit 314. Sensing circuit 314 can include an operational amplifier 308, feedback resistor 312, feedback capacitor 310 and an input voltage source 306, although other configurations can be employed. For example, feedback resistor 312 can be replaced by a switched capacitor resistor in order to minimize any parasitic capacitance effect caused by a variable feedback resistor. Touch pixel electrode 302 can be coupled to the inverting input of operational amplifier 308. An AC voltage source 306 (Vac) can be coupled to the non-inverting input of operational amplifier 308. Touch sensor circuit 300 can be configured to sense changes in the total self-capacitance 304 of the touch pixel electrode 302 induced by a finger or object either touching or in proximity to the touch sensor panel. Output 320 can be used by a processor to determine the presence of a proximity or touch event, or the output can be inputted into a discrete logic network to determine the presence of a touch or proximity event.

Figure 4:
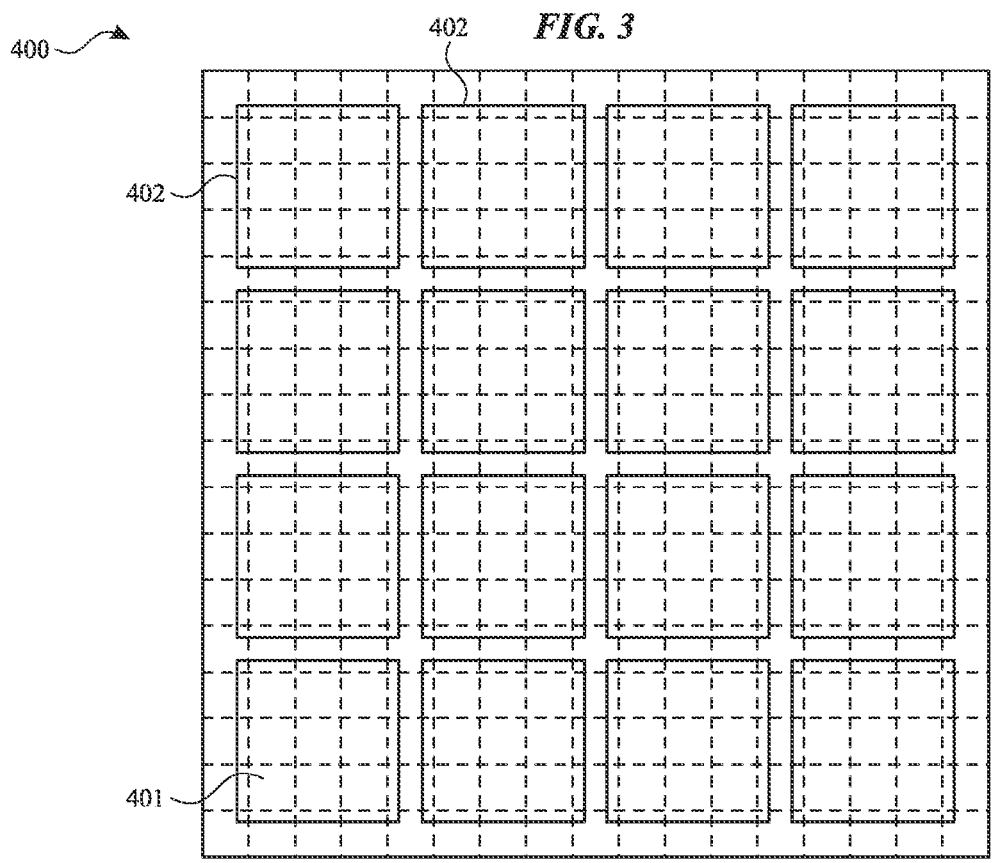
FIG. 4 illustrates an example configuration in which common electrodes can form portions of the touch sensing circuitry of a touch sensing system according to examples of the disclosure.

Referring back to FIG. 2, in some examples, touch screen 220 can be an integrated touch screen in which touch sensing circuit elements of the touch sensing system can be integrated into the display pixel stack-ups of a display. The circuit elements in touch screen 220 can include, for example, elements that can exist in LCD or other displays, such as one or more pixel transistors (e.g., thin film transistors (TFTs)), gate lines, data lines, pixel electrodes and common electrodes. In any given display pixel, a voltage between a pixel electrode and a common electrode can control a luminance of the display pixel. The voltage on the pixel electrode can be supplied by a data line through a pixel transistor, which can be controlled by a gate line. It is noted that circuit elements are not limited to whole circuit components, such as a whole capacitor, a whole transistor, etc., but can include portions of circuitry, such as only one of the two plates of a parallel plate capacitor. FIG. 4 illustrates an example configuration in which common electrodes 402 can form portions of the touch sensing circuitry of a touch sensing system—in some examples of this disclosure, the common electrodes can form touch pixel electrodes used to detect an image of touch on touch screen 400, as described above. Each common electrode 402 (which can define a "touch region" of the touch screen) can include a plurality of display pixels 401, and each display pixel 401 can include a portion of a common electrode 402, which can be a circuit element of the display system circuitry in the pixel stack-up (i.e., the stacked material layers forming the display pixels) of the display pixels of some types of LCD or other displays that can operate as part of the display system to display an image.

In the example shown in FIG. 4, each common electrode 402 can serve as a multi-function circuit element that can operate as display circuitry of the display system of touch screen 400 and can also operate as touch sensing circuitry of the touch sensing system. In this example, each common electrode 402 can operate as a common electrode of the display circuitry of the touch screen 400, as described above, and can also operate as touch sensing circuitry of the touch screen. For example, a common electrode 402 can operate as a capacitive part of a touch pixel electrode of the touch sensing circuitry during the touch sensing phase. Other circuit elements of touch screen 400 can form part of the touch sensing circuitry by, for example, switching electrical connections, etc. More specifically, in some examples, during the touch sensing phase, a gate line can be connected to a power supply, such as a charge pump, that can apply a voltage to maintain TFTs in display pixels included in a touch pixel electrode in an "off" state. Stimulation signals can be applied to common electrode 402. Changes in the total self-capacitance of common electrode 402 can be sensed through an operational amplifier, as previously discussed. The change in the total self-capacitance of common electrode 402 can depend on the proximity of a touch object, such as finger 305, to the common electrode. In this way, the measured change in total self-capacitance of common electrode 402 can provide an indication of touch on, or proximity near, the touch screen.

In general, each of the touch sensing circuit elements may be either a multi-function circuit element that can form part of the touch sensing circuitry and can perform one or more other functions, such as forming part of the display circuitry, or may be a single-function circuit element that can operate as touch sensing circuitry only. Similarly, each of the display circuit elements may be either a multi-function circuit element that can operate as display circuitry and perform one or more other functions, such as operating as touch sensing circuitry, or may be a single-function circuit element that can operate as display circuitry only. Therefore, in some examples, some of the circuit elements in the display pixel stack-ups can be multi-function circuit elements and other circuit elements may be single-function circuit elements. In other examples, all of the circuit elements of the display pixel stack-ups may be single-function circuit elements.

In addition, although examples herein may describe the display circuitry as operating during a display phase, and describe the touch sensing circuitry as operating during a touch sensing phase, it should be understood that a display phase and a touch sensing phase may be operated at the same time, e.g., partially or completely overlap, or the display phase and touch sensing phase may operate at different times. Also, although examples herein describe certain circuit elements as being multi-function and other circuit elements as being single-function, it should be understood that the circuit elements are not limited to the particular functionality in other examples. In other words, a circuit element that is described in one example herein as a single-function circuit element may be configured as a multi-function circuit element in other examples, and vice versa.

The common electrodes 402 (i.e., touch pixel electrodes) and display pixels 401 of FIG. 4 are shown as rectangular or square regions on touch screen 400. However, it is understood that the common electrodes 402 and display pixels 401 are not limited to the shapes, orientations, and positions shown, but can include any suitable configurations according to examples of the disclosure.

As described above, the self-capacitance of each common electrode 402 (i.e., touch pixel electrode) in touch screen 400 can be sensed to capture an image of touch across touch screen 400. To allow for the sensing of the self-capacitance of individual common electrodes 402, it can be necessary to route one or more electrical connections between each of the common electrodes and the touch sensing circuitry (e.g., sense channels 208) of touch screen 400. In some examples, such electrical connections can be formed underneath the structures of touch screen 400, such as display pixels 401 and/or common electrodes 402, so as to avoid increasing the size of the touch screen and/or to reduce the effect of such connections on the electrical and/or optical performance of the touch screen.

Figure 5:
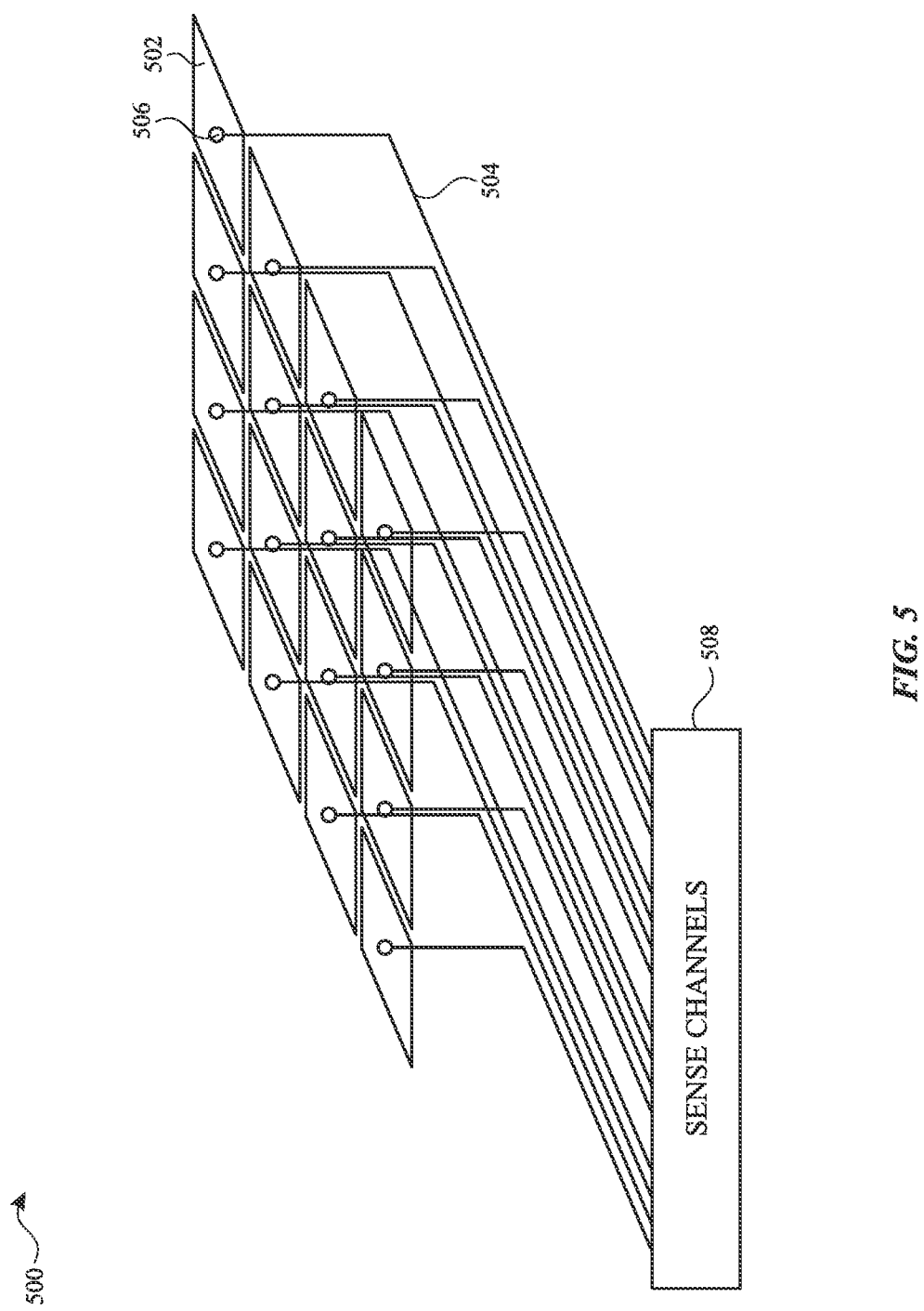
FIG. 5 illustrates an example configuration for electrically connecting touch pixel electrodes in a touch screen to sense channels according to examples of the disclosure.

FIG. 5 illustrates an example configuration for electrically connecting touch pixel electrodes in touch screen 500 to sense channels 508 according to examples of the disclosure. Touch screen 500 can include touch pixel electrodes 502, as described above. Components of touch screen 500 other than touch pixel electrodes 502 are not illustrated for simplicity. Each of touch pixel electrodes 502 can be electrically connected to sense channels 508 through sense connections 504 and vias 506. Vias 506 can allow for an electrical connection between touch pixel electrodes 502 and sense connections 504 through one or more intervening layers that may exist between the touch pixel electrodes and the sense connections in touch screen 500. Selective placement of sense connections 504 and vias 506 in relation to other components of touch screen 500 can reduce optical effects the sense connections and vias may have on an image displayed on the touch screen. Further, in some examples, sense connections 504 can be made to be relatively "deep" (i.e., far from touch pixel electrodes 502 and display pixel components) in the stack-up of touch screen 500 so as to reduce parasitic effects that the sense connections might have on the operation of the touch pixel electrodes and/or any other components of the touch screen.

Figure 6:
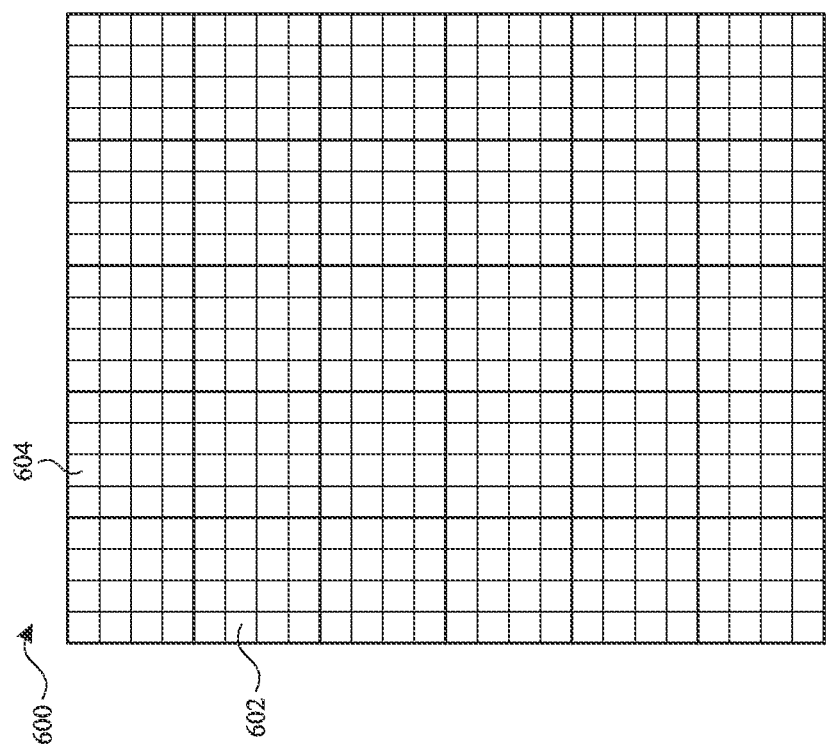
FIG. 6 illustrates an example pixelated self-capacitance touch sensor panel configuration according to examples of the disclosure.

In some examples, the number of sense channels can correspond to the number of touch pixel electrodes. In the example illustrated in FIG. 5, sense channels 508 can include an individual sense channel for each touch pixel electrode 502. As the number of touch pixel electrodes in a panel increases, however, a dedicated sense channel for each individual touch pixel electrode can increase hardware demands for the touch system, and correspondingly increase power consumption. For example, FIG. 6 illustrates an example pixelated self-capacitance touch sensor panel configuration according to examples of the disclosure. The touch sensor panel 600 can include a 24×20 array of individual touch pixel electrodes, such as touch pixel electrodes 602 and 604 (for a total of 480 individual touch pixel electrodes). Although the touch sensor panel 600 illustrated in FIG. 6 includes a 24×20 array of rectangular or square individual pixel electrodes, it should be understood that the touch sensor panel can include a different number and configuration of touch pixel electrodes having different shapes or sizes. During operation, a touch pixel electrode can be stimulated with an AC waveform, and the self-capacitance to ground of the touch pixel electrode can be measured. As an object approaches the touch pixel electrode, the self-capacitance to ground of the touch pixel electrode can change. This change in the self-capacitance of the touch pixel electrode can be detected and measured by the touch sensing system to determine the positions of multiple objects when they touch, or come in proximity to, the touch screen. During a full panel scan, each touch pixel electrode in the touch sensor panel can be sensed (e.g., sequentially or simultaneously) and the change in self-capacitance measured at each of the pixel electrodes in the panel can be viewed as an image of touch on the touch sensor panel.

In order to simultaneously perform a self-capacitance scan of each touch pixel electrode in the 24×20 array of individual touch pixel electrodes illustrated in FIG. 6, the touch system can require 480 sense channels. As discussed above, the large number of required sense channels can increase the amount of hardware required to perform self-capacitance scans of the entire touch sensor panel, thereby increasing power consumption of the touch sensing device. Alternatively, a smaller number of sense channels can be used and self-capacitance scans can be time-multiplexed to sense each touch pixel electrode using a plurality of scan steps to scan the entire touch sensor panel. Time-multiplexing the operation of the sense channels can degrade touch performance by increasing the time required to scan the panel, and can also increase power consumption.

In some examples, the number of sense/receive channels required by touch system can be reduced by operating in two or more different scanning modes. The connections between touch pixel electrodes in a touch sensor panel or touch screen and sense channels can be different in different modes of operation. For example, a pixelated self-capacitance touch sensor panel or touch screen can have two different operating modes, a coarse detection scanning mode and a fine detection scanning mode. During the coarse detection scanning mode and the fine detection scanning mode, the available sense channels can be allocated to touch pixel electrodes as will be described in more detail below.

Figure 7:
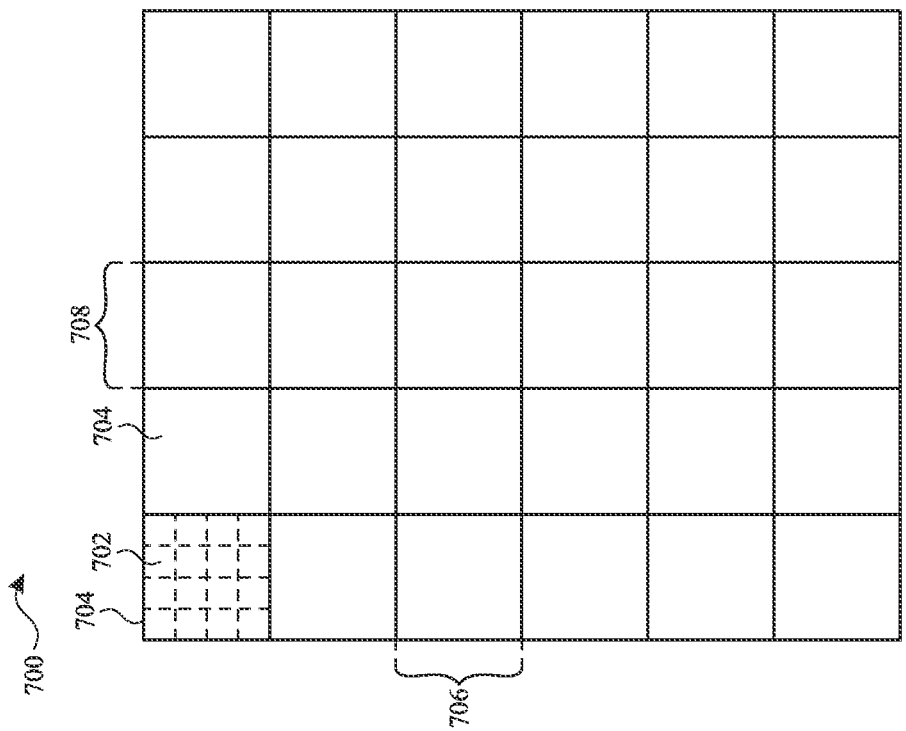
FIG. 7 illustrates an example pixelated self-capacitance touch sensor panel configured to include super-pixel electrodes according to examples of the disclosure.

During the coarse detection scanning mode, a plurality of individual touch pixel electrodes can be coupled together to form a super-pixel electrode. The super-pixel electrode can be coupled to a sense channel. Scanning a plurality of super-pixel electrodes can provide coarse location information of an object touching or in proximity to the touch sensor panel. In some examples, the number of sense channels provided in the touch system can be at least the number of sense channels necessary to simultaneously sense each of the super-pixel electrodes in the touch sensor panel (and generate a coarse image of touch for the panel). FIG. 7 illustrates an example pixelated self-capacitance touch sensor panel configured to include super-pixel electrodes according to examples of the disclosure. Touch sensor panel 700 can include individual touch pixel electrodes, such as touch pixel electrode 702. A number of touch pixels electrodes (e.g., N touch pixel electrodes) can be grouped together (e.g., selectively coupled) during some modes (e.g., coarse detection scanning mode) of operation to form super-pixel electrodes, such as super-pixel electrode 704. As illustrated in FIG. 7, super-pixel electrode 704 can include 16 individual touch pixel electrodes 702, though a super-pixel electrode can be formed from any suitable number of individual touch pixel electrodes. Additionally, although illustrated in FIG. 7 in a square configuration, super-pixel electrode 704 can include individual touch pixel electrodes 702 forming different shapes. A number of super-pixel electrodes arranged in a row or column can be referred to as a super-row 706 or a super-column 708, respectively. Although the touch sensor panel 700 illustrated in FIG. 7 includes a 6×5 array of super-pixel electrodes, it should be understood that the touch sensor panel can include a different number and configuration of super-pixel electrodes.

During a coarse scan of the pixelated self-capacitance touch sensor panel or touch screen (i.e., common mode super-pixel scan), a super-pixel electrode can be stimulated with an AC waveform, and the self-capacitance to ground of the super-pixel electrode can be measured. As an object approaches the super-pixel electrode, the self-capacitance to ground of the super-pixel electrode can change. This change in the self-capacitance of the super-pixel electrode can be detected and measured by the touch sensing system to determine the positions of multiple objects when they touch or come in proximity to the touch screen. During a coarse scan, each super-pixel electrode can be sensed (e.g., sequentially or simultaneously) and the change in self-capacitance measured at each of the super-pixel electrodes in the panel can be viewed together as a coarse image of touch on the touch sensor panel. Stimulating super-pixels during a coarse scan rather than stimulating individual touch pixel electrodes can reduce the number of sense channels required to scan the entire touch sensor panel during a coarse scan. For example, a super-pixel containing 16 individual touch pixel electrodes can reduce the number of sense channels necessary by a factor of 16. Thus, rather than needing 480 sense channels as required for a 24×20 array of individual pixel electrodes, a 6×5 configuration of super-pixel electrodes can require only 30 sense/receive channels. In addition to hardware savings, the coarse scan can also be completed faster than a full panel scan of individual touch pixel electrodes (assuming fewer sense channels available than individual touch pixel electrodes) and consume less power than a full panel scan of individual touch pixel electrodes. In some cases, the number of super-pixel electrodes and sense/receive channels can be the same, such that the entire panel can be scanned at once.

The common mode super-pixel scan can be used to detect the presence of a stylus, pen or other touching object, and provide coarse information about its location. For example, the super-pixel electrode with the maximum touch value (e.g., corresponding to the largest change in self-capacitance due to the stylus) can be identified by the touch system. Additional location information can be estimated using touch values from adjacent super-pixel electrodes. For example, one or more centroids can be calculated using the touch values corresponding to the super-pixel having the maximum touch value and one or more super-pixels adjacent to the super-pixel electrode having the maximum value. The centroids can indicate whether the stylus location corresponds to the top, bottom or middle of the super-pixel electrode with the maximum touch value, and also whether the stylus location corresponds to the left, right or middle portion of the super pixel electrode. Other metrics can be used instead of or in addition to the centroid to determine additional location information (e.g., relative magnitudes or ratios of magnitudes of touch signals for adjacent super-pixels).

After performing a coarse scan, a fine scan can be performed. The fine scan can use information from the coarse scan to minimize the number of individual touch pixel electrodes scanned. Reducing the number of individual touch pixel electrodes scanned can reduce scan time and power consumption, and make efficient use of the available sense/receive channel hardware. For example, if the coarse scan identifies a touch or proximity event at a super-pixel electrode, the fine scan can focus on the individual touch pixel electrodes in the identified super-pixel electrode and possibly some adjacent super-pixel electrodes. If the coarse scan provides additional location information (e.g., top left or center, etc.), the touch system can make use of the additional location information to be more selective about which individual touch pixel electrodes to scan during the fine scan. In some examples, the minimum number of sense channels available for the touch system can correspond to the greater of the number of touch pixel electrodes necessary to perform a fine scan or the number of super-pixel electrodes necessary to perform a coarse scan (e.g., to scan the super-pixel electrodes for the touch sensor panel simultaneously).

In some examples, the fine scan can be a per-pixel individual touch pixel electrode scan. A per-pixel individual touch pixel electrode scan can scan a plurality of individual touch pixel electrodes at or in proximity to the location of a stylus or other object identified by the coarse scan. The touch system can reconfigure the connection between the touch pixel electrodes of the touch sensor panel and sense/receive channels for a fine scan. During the fine scan, individual touch pixel electrodes can be scanned and touch values can be generated for the individual touch pixel electrodes. Touch pixel electrodes not scanned during the fine scan can be held at a fixed voltage or grounded (not sensed). The number of individual touch pixel electrodes scanned can be based on the physical footprint of the stylus (e.g., larger stylus footprint can require scanning more individual pixel electrodes than a smaller stylus footprint) or stylus orientation. In some cases, one or more individual touch pixel electrodes in one or more adjacent super-pixels in a super-column and/or super-row can be scanned (simultaneously if enough sense channels are available, or in multiple scan steps).

In other examples, the fine scan can be a row scan and/or column scan. A row scan can scan a plurality of row electrodes formed from individual touch pixel electrodes at or in proximity to the location of the stylus identified by the coarse scan. A column scan can scan a plurality of column electrodes formed from individual touch pixel electrodes at or in proximity to the location of the stylus identified by the coarse scan. The system can reconfigure the connection between the electrodes of the touch sensor panel and sense/receive channels for a fine scan. For example, selected row electrodes or column electrodes can be coupled with corresponding sense/receive channels. During the fine scan (including one or more scans), rows or columns of individual touch pixel electrodes can be scanned and touch values can be generated for the rows or columns of individual touch pixel electrodes. Touch pixel electrodes not scanned during the fine scan can be held at a fixed voltage or grounded (i.e., not sensed). The number of rows or columns of individual touch pixel electrodes (row electrodes/column electrodes) scanned can be based on the physical footprint of the stylus or the orientation of the stylus. In some cases, one or more rows or columns of individual touch pixel electrodes in one or more adjacent super-pixels in a super-column and/or super-row can be scanned (simultaneously if enough sense channels are available, or in multiple scan steps). Scanning some or all of the rows or columns in one or more adjacent super-pixels can help provide sufficient information to generate a stylus signal profile. The signal profile can be used by a position calculation algorithm to calculate the position of the stylus along one or both axes (e.g. vertical axis/y-axis or horizontal axis/a-axis) with appropriate accuracy.

In some examples, multiple objects (e.g., multiple styli) can be used simultaneously. In some examples, the touch sensing device can time-multiplex (e.g., scan for each stylus at a different time) the coarse and fine detection of the two stylus devices. In other examples, the touch sensing device can frequency-multiplex (e.g., scan for each stylus at a different frequency) the coarse and fine detection of the two stylus devices, though additional sense/receive channels may be necessary to perform the scans for both styli in parallel.

Figure 8:
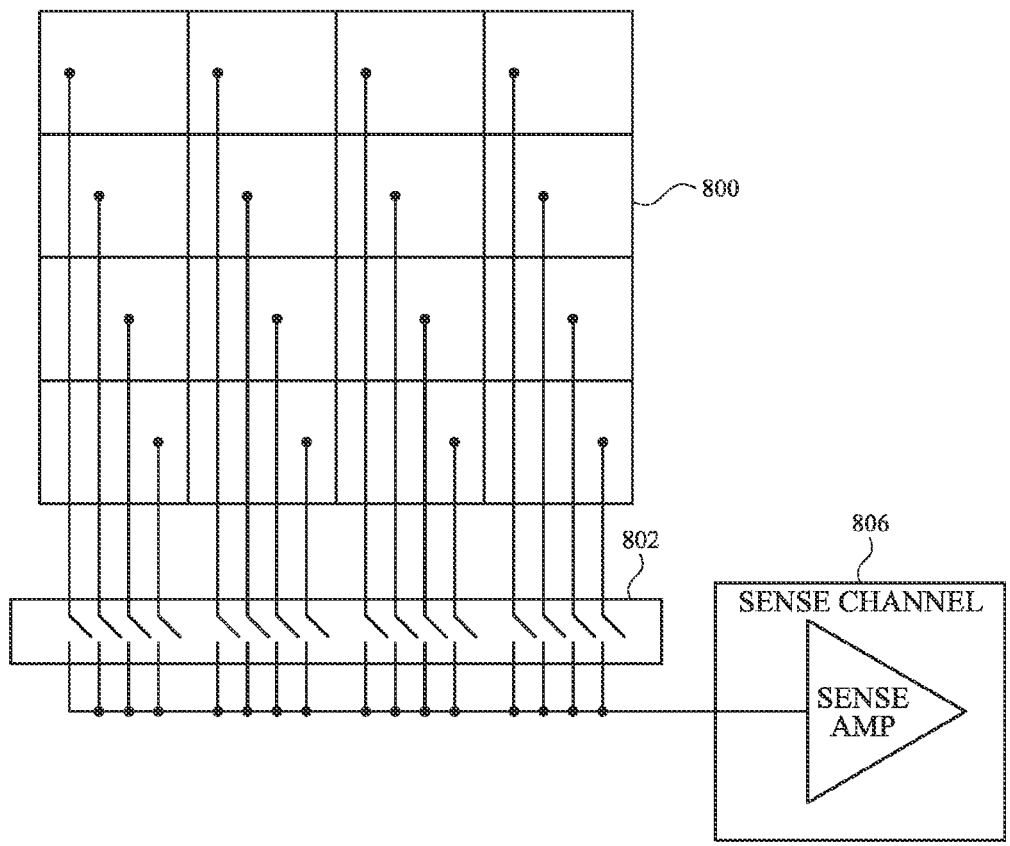
FIG. 8 illustrates example circuitry for coupling individual touch pixel electrodes to a sense channel according to examples of the disclosure.

Switching circuitry can be used to configure the connections between the electrodes of the touch sensor panel and the sense channels according to the mode of operation. FIG. 8 illustrates example circuitry for coupling individual touch pixel electrodes to a sense channel according to examples of the disclosure. For simplicity, FIG. 8 illustrates a portion of a touch sensor panel corresponding to individual touch pixel electrodes configurable to form super-pixel 800 and one sense channel 806. Super-pixel 800 can include 16 individual touch pixel electrodes, for example. FIG. 8 also illustrates switching unit 802, corresponding to sense channel 806, coupled to both the individual touch pixel electrodes in super-pixel 800 and to the input of sense channel 806. Switching unit 802 can include individual switches to couple each of the individual pixel electrodes in super-pixel 800 to the input of sense channel 806. During a coarse scan, the switches in switching unit 802 can be closed to form super-pixel 800 and to sense the self-capacitance of super-pixel 800 at sense channel 806. During a fine scan, one of the switches in switching unit 802 can be closed such that one individual pixel electrode can be coupled to and sensed by sense channel 806 (or a subset of the switches corresponding to a row or column of individual touch pixel electrodes for a row or column fine scan).

Although not shown, switching unit 802 can be controlled by the channel scan logic 210 in touch controller 206, for example. Additionally, although illustrated as including a plurality of individual switches, switching unit 802 can be implemented with a multiplexer (MUX), programmable logic device or gate array, or any other suitable switching element(s).

Figure 9:
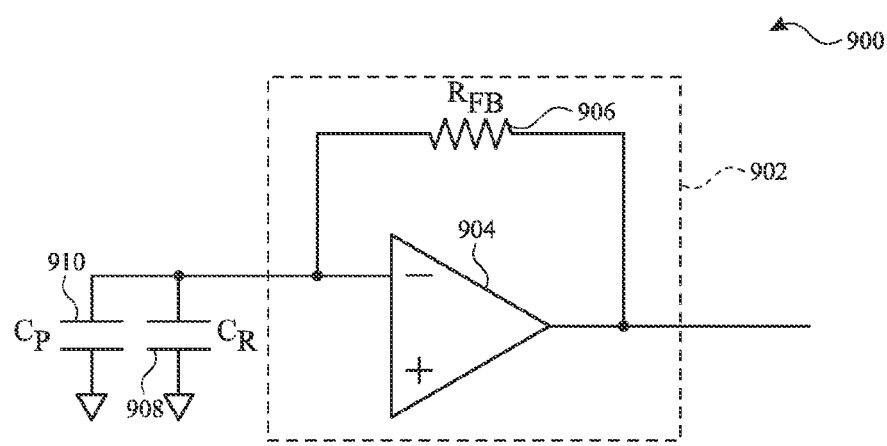
FIG. 9 illustrates an example circuit for a sense channel and individual pixel electrode according to examples of the disclosure.

Coupling a different number of individual touch pixel electrodes to a sense channel during different operating modes can alter the stability of the sense amplifiers in sense channels. FIG. 9 illustrates an example circuit for a sense channel and individual pixel electrode according to examples of the disclosure. Circuit 900 includes a sense channel 902 including a sense amplifier 904 and feedback resistor 906 coupled between the inverting input and the output of sense amplifier 904. Although not shown, the feedback path can include additional components forming a feedback network. Additionally, circuit 900 can model, with equivalent circuit elements, the effect of the parasitic capacitance 910 ($C_p$) of the touch pixel electrode and the routing capacitance 908 ($C_r$) between the touch pixel electrode and the sense amplifier 904 input. The transfer function for the amplifier circuit including the capacitive loading of the touch pixel electrode can include at least two poles. The sense amplifier circuit can cause a dominant pole and the input loading from the individual touch pixel electrode capacitive loading ($C_p$) can cause a second pole.

Figure 15:
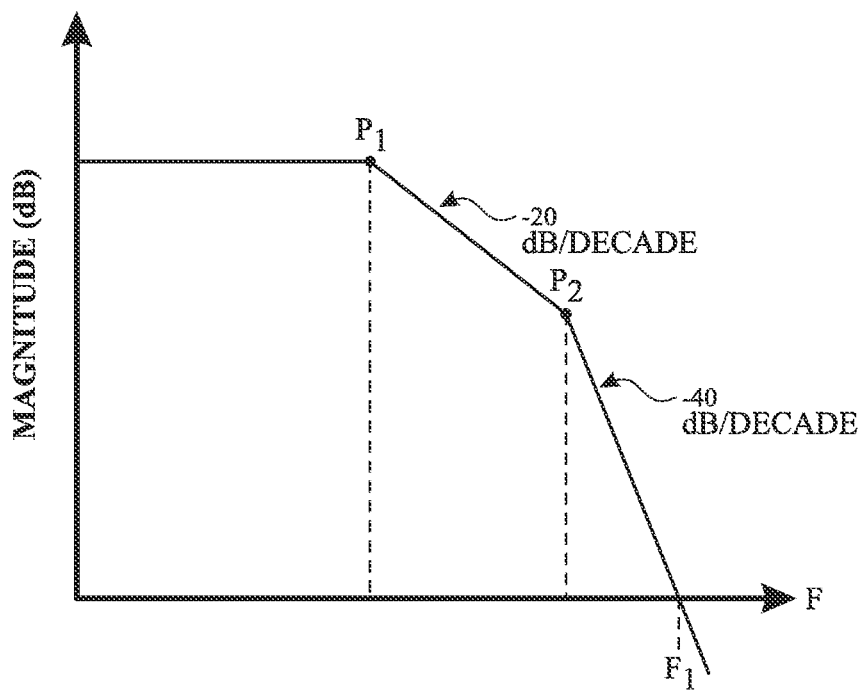
FIG. 15 illustrates an example Bode magnitude plot for a transfer function corresponding to the circuit of FIG. 9 according to examples of the disclosure.

FIG. 15 illustrates an example Bode magnitude plot for a transfer function corresponding to the circuit of FIG. 9 according to examples of the disclosure. As illustrated by FIG. 15, the dominant pole, $P_1$, can introduce a −20 dB per decade decline in the magnitude of transfer function as well as correspond to a 90° phase shift. Likewise, the second pole, $P_2$, can introduce an additional −20 dB per decade decline in the magnitude of transfer function as well as correspond to another 90° phase shift. For stability, the transfer function of the circuit should not achieve 180° of phase shift within the unity gain bandwidth. Components of feedback circuit can be selected and the amplifier designed for stability, for example, by increasing the frequency of the second pole, thereby increasing the separation between the dominant pole of the sense amplifier and second pole formed by the input capacitance (and thereby pushing the 180° phase shift outside of the unity gain bandwidth). Additionally, it can be desirable to design the circuit with some phase margin for improved stability. Thus, one stability condition for the circuit having a two-pole transfer function can be to maintain a threshold spacing between the dominant and second pole, such that the circuit does not introduce a 180° phase shift within the unity bandwidth (or within the phase margin of a 180° phase shift).

Figure 10:
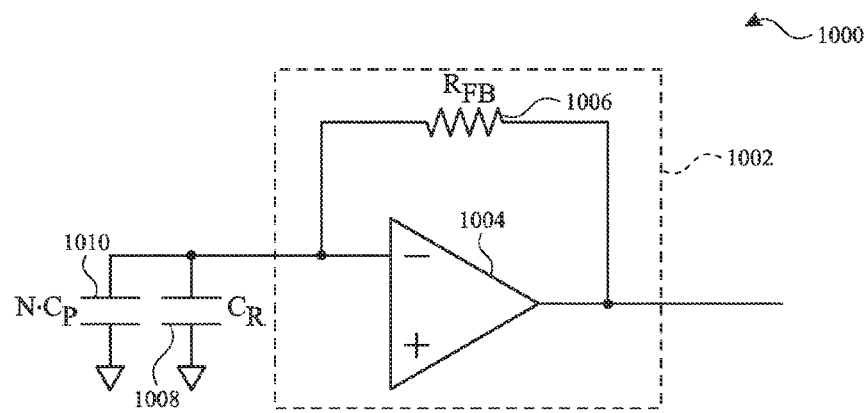
FIG. 10 illustrates an example circuit for a sense channel and a plurality of individual pixel electrodes according to examples of the disclosure.

Increasing the number of electrodes coupled to the sense channel can increase the input capacitance of sense channel, thereby violating a stability condition. FIG. 10 illustrates an example circuit for a sense channel and a plurality of individual pixel electrode according to examples of the disclosure. Circuit 1000 includes a sense channel 1002 including a sense amplifier 1004 and feedback resistor 1006 coupled between the inverting input and the output of sense amplifier 1004. Although not shown, the feedback path can include additional components forming a feedback network. Additionally, circuit 1000 can model, with equivalent circuit elements, the effect of the parasitic capacitance 1010 ($N \cdot C_p$, where N can correspond to the number of individual pixel electrodes coupled to the input of the sense channel) of the plurality of individual touch pixel electrodes coupled together and the routing capacitance 1008 ($C_r$) between the touch pixel electrodes and the sense amplifier 1004 input. The sense amplifier circuit can create a dominant pole and the input loading from the plurality of individual touch pixel electrodes ($N \cdot C_p$) can create a second pole. As the number of individual pixel electrodes increases, the capacitive effect can cause the second pole to be closer to the dominant pole reducing the operating bandwidth of the sense amplifier. In a touch system with 16 individual touch pixel electrodes per sense channel, the parasitic capacitive loading during a coarse scan can be 16 times the parasitic input capacitance expected during a fine scan. As a result, the amplifier can become unstable during the coarse scan configuration.

Figure 16:
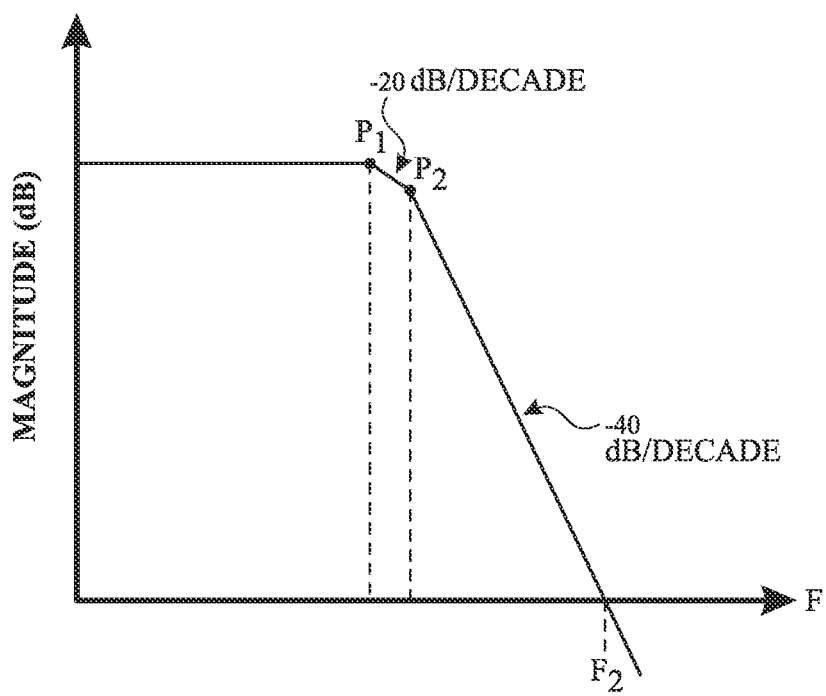
FIG. 16 illustrates an example Bode magnitude plot for a transfer function corresponding to the circuit of FIG. 10 according to examples of the disclosure.

FIG. 16 illustrates an example Bode magnitude plot for a transfer function corresponding to the circuit of FIG. 10 according to examples of the disclosure. As illustrated by FIG. 16, the dominant pole, $P_1$, can introduce a −20 dB per decade decline in the magnitude of transfer function as well as correspond to a 90° phase shift. Likewise, the second pole, $P_2$, can introduce an additional −20 dB per decade decline in the magnitude of transfer function as well as correspond to another 90° phase shift. Compared with $P_2$ of FIG. 15, $P_2$ of FIG. 16 can be a lower frequency pole. For stability, the transfer function of the circuit should not achieve 180° of phase shift within the unity gain bandwidth (or within the phase margin of a 180° phase shift). Thus, the lower frequency second pole in FIG. 15 can reduce the bandwidth for which the sense amplifier can be stable as compared with the sense amplifier of FIG. 15. Thus, for a sense amplifier designed to for operation with a given expected parasitic input capacitance, increasing the parasitic input capacitance can cause the sense amplifier to be unstable within the original operating bandwidth.

The sense amplifier can be stabilized (satisfy stability conditions) for both modes of operation by adjusting the configuration of the sense amplifier circuit based on the mode of operation. For example, the sense amplifier can be designed for stability in the fine scan mode (e.g., when an individual touch pixel electrode can be coupled to the sense channel, or a relatively small number of individual touch pixel electrodes forming rows or columns) A variable resistance circuit can be included in series with the inverting input of the sense amplifier, and the resistance of the variable resistance circuit can be adjusted during coarse mode scanning to stabilize the circuit as input capacitance increases. The resistance of the variable resistance circuit can reduced or minimized (e.g., to zero) during the fine scanning mode (assuming the sense amplifier was designed for stability in the fine scan mode without additional input resistance).

Figure 11:
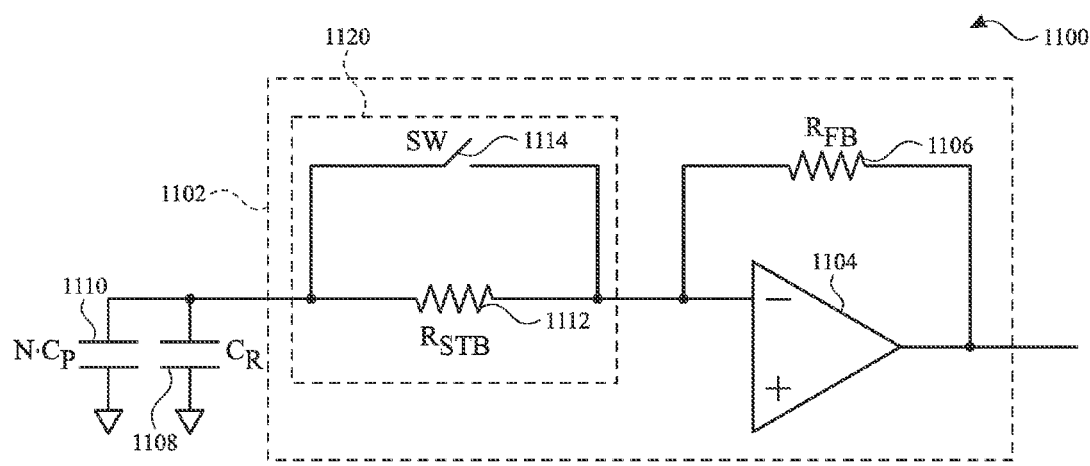
FIG. 11 illustrates an example circuit for a sense channel including a variable resistance circuit and one or more individual touch pixel electrodes according to examples of the disclosure.

FIG. 11 illustrates an example circuit for a sense channel including a variable resistance circuit and one or more individual touch pixel electrodes according to examples of the disclosure. Circuit 1100 includes a sense channel 1102 including a sense amplifier 1104 and feedback resistor 1106 coupled between the inverting input and the output of sense amplifier 1104. Although not shown, the feedback path can include additional components forming a feedback network. Sense channel 1102 can also include a variable resistance circuit 1120 in the input path (in series) between the individual pixel electrode and the input to sense amplifier 1104. Variable resistance circuit 1120 can, for example, include stability resistor 1112 and switch 1114 to bypass the stability resistor. Switch 1114 and stability resistor 1112 together can also be referred to as a switchable resistor. Additionally, circuit 1100 can model, with equivalent circuit elements, the effect of the parasitic capacitance 1110 ($N \cdot C_p$, where N can correspond to the number of individual pixel electrodes coupled to the input of the sense channel) of the plurality of individual touch pixel electrodes coupled together and the routing capacitance 1108 ($C_r$) between the touch pixel electrodes and the sense amplifier 1104 input. As discussed above with regard to FIGS. 9 and 10, the sense amplifier can create a dominant pole and the input capacitive loading from the one or more individual touch pixel electrodes ($N \cdot C_p$) can create a second pole. The sense amplifier 1104 and feedback resistor 1106 can be designed to be stable for a small number of input electrodes or only one input electrode (i.e., for N=1). Thus, during a fine scan mode when N can be one or relatively small and the sense amplifier circuit can be stable without additional input resistance, the equivalent resistance of the variable resistance circuit can be set to zero. For example, switch 1114 can be closed to bypass stability resistor 1112. Stabilizing the circuit in the fine scan without input resistance can be desirable because the input resistance associated with the variable resistance circuit can attenuate the input signal and degrade touch location detection. During a coarse scan, the variable resistance circuit can be adjusted to increase the equivalent resistance. As the equivalent resistance of the variable resistance circuit 1120 increases, the equivalent resistance in series with the input of the sense amplifier 1104 and the input capacitance from the electrodes can form a zero in the transfer function of the circuit. The zero can be at a frequency corresponding to $1/N \cdot C_p \cdot R_{stb}$, where $R_{stb}$ can correspond to the equivalent resistance of the variable resistance circuit 1120. Introducing a zero into the transfer function of the system can stabilize the sense amplifier during the coarse scan mode when N can be large.

Figure 17:
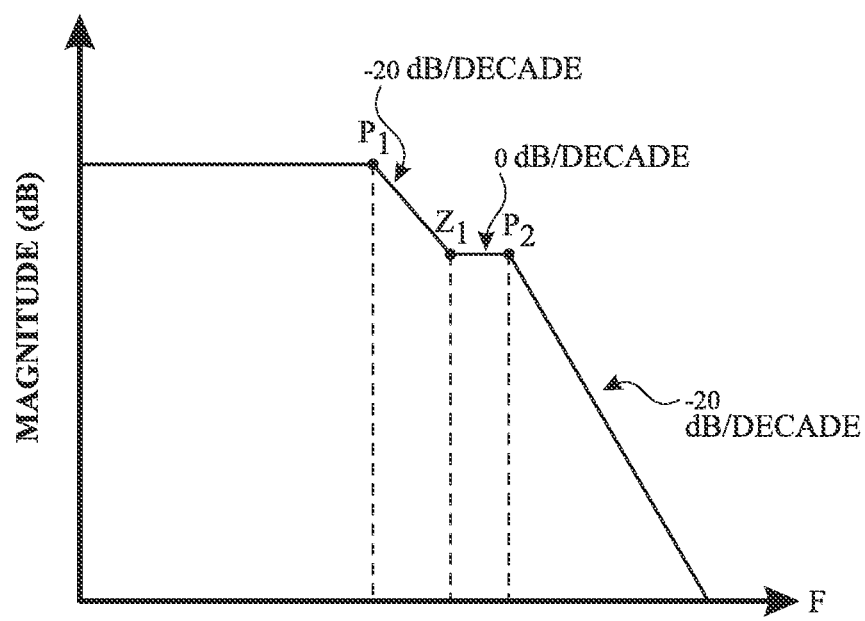
FIG. 17 illustrates an example Bode magnitude plot for a transfer function corresponding to the circuit of FIG. 11 according to examples of the disclosure.

FIG. 17 illustrates an example Bode magnitude plot for a transfer function corresponding to the circuit of FIG. 11 according to examples of the disclosure. As discussed above, the sense amplifier and parasitic capacitive loading of one or more input touch pixel electrodes can generate two poles. Dominant pole, $P_1$, can introduce a −20 dB per decade decline in the magnitude of transfer function as well as correspond to a 90° phase shift. Likewise, the second pole, $P_2$, can introduce an additional −20 dB per decade decline in the magnitude of transfer function as well as correspond to another 90° phase shift. Unlike in FIGS. 15 and 16, in FIG. 17 a zero, $Z_1$, can be introduced in the transfer function due to the capacitive loading of the electrodes and the equivalent resistance of the variable resistance circuit (e.g., when switch 1114 is open). The zero, $Z_1$, can introduce a +20 dB per decade increase in the magnitude of the transfer function as well as a 90° phase shift in the opposite direction of the phase shift caused by a pole. As a result, the circuit can be stabilized over an extended bandwidth, as the zero can counteract the phase shifting effects of the second pole if designed properly. The equivalent resistance of variable resistance circuit can be set so that the zero can be introduced proximate to the second pole.

Although, the variable resistance circuit can attenuate the input signal sensed by the sense channel, during the coarse scan mode the touch system does not require as much accuracy in the sensed signal as needed during a fine scan. Thus, the variable resistance circuit can be used to achieve sense amplifier stability irrespective of the touch scanning mode.

Although not shown in FIG. 11, the equivalent resistance of variable resistance circuit 1120 can be controlled by the channel scan logic 210 in touch controller 206, for example. When variable resistance circuit 1120 includes switch 1114, the control can include opening and closing the switch depending on the mode of operation (e.g., open during coarse scan; closed during fine scan) or depending on an estimated input capacitance due to the one or more electrodes (e.g., based on the number of electrodes or based on a measurement of the input capacitance). Additionally, switch 1114 can be implemented with a multiplexer (MUX), programmable logic device or gate array, or any other suitable switching element(s).

In some examples, stability resistor 1112 can be implemented as a fixed resistance resistor. The resistance of stability resistor 1112 can be designed to create stability for a given number of electrodes (or a corresponding given input capacitance) expected during the coarse scan. In other examples, stability resistor 1112 can also be implemented with an adjustable resistor. The adjustable stability resistor can be tuned during manufacture to achieve the desired stability for a coarse scan depending on properties of the electrodes to be coupled to the sense channels. In some examples, the number of electrodes coupled to a sense channel can also be dynamically changed, and the stability resistor can also be dynamically adjusted (e.g., by control from channel scan logic 210) to maintain the stability conditions for the sense amplifier given the number of electrodes coupled to the sense channel. The appropriate equivalent resistance of the variable resistance circuit, and therefore the resistance of stability resistor 1112, can be tuned empirically or based on a value from a look-up table, for example. For example, the resistance of the stability resistor can be adjusted to a first resistance for a sense channel sensing 30 electrodes (or for an input capacitance associated with 30 electrodes of the touch sensor panel) during a first scan based on first one or more values from the look-up table, and adjusted to a second resistance for a sense channel sensing 15 electrodes (or for an input capacitance associated with 15 electrodes of the touch sensor panel) during a second scan based second one or more values.

Figure 12:
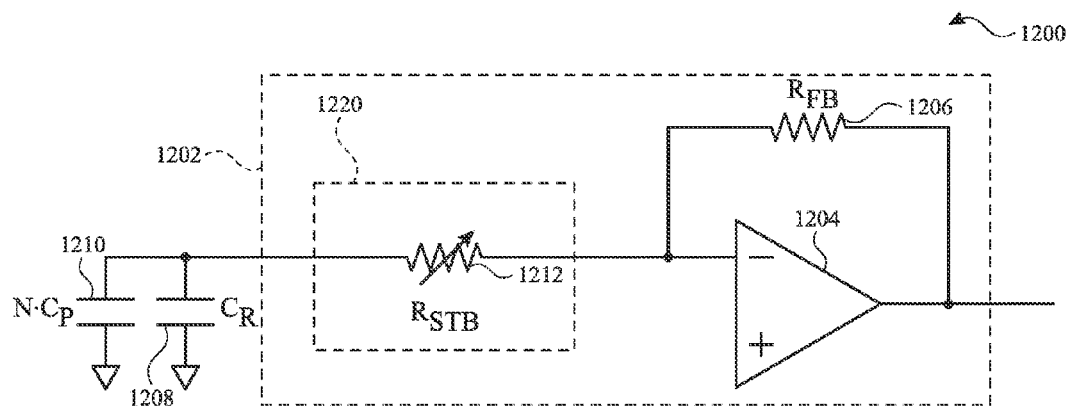
FIG. 12 illustrates another example circuit for a sense channel including a variable resistance circuit and one or more individual pixel electrodes according to examples of the disclosure.

In some examples, rather than implementing the variable resistance circuit 1120 as a switch 1114 and stability resistor 1112, the variable resistance circuit can include an adjustable resistor in series with the sense amplifier. FIG. 12 illustrates another example circuit for a sense channel including a variable resistance circuit and one or more individual pixel electrodes according to examples of the disclosure. Circuit 1200 includes a sense channel 1202 including a sense amplifier 1204 and feedback resistor 1206 coupled between the inverting input and the output of sense amplifier 1204. Although not shown, the feedback path can include additional components forming a feedback network. Sense channel 1202 can also include a variable resistance circuit 1220 in the input path (in series) between the individual pixel electrode and the input to sense amplifier 1204. Variable resistance circuit 1220 can, for example, include an adjustable stability resistor 1212 in the input path (in series) between the individual pixel electrode and the input to sense amplifier 1204. Although not shown, the resistance of adjustable stability resistor 1212 can be controlled by the channel scan logic 210 in touch controller 206, for example. The resistance of adjustable stability resistor 1212 can be set based on mode of operation and/or the number of electrodes coupled to the sense channel, and/or a an estimate of the capacitive loading of the one or more electrodes. The appropriate equivalent resistance of the variable resistance circuit, and therefore the resistance of adjustable stability resistor 1212, can be tuned empirically or based on a value from a look-up table, for example to satisfy stability conditions for the sense amplifier. In some examples, the resistance of the adjustable stability resistor can be set to zero (minimized) unless a threshold input capacitance or threshold number of electrodes is coupled to the sense channel. Once the threshold is exceeded, the resistance can be adjusted or scaled upward according to the number of electrodes or input capacitance.

Additionally, circuit 1200 can model, with equivalent circuit elements, the effect of the parasitic capacitance 1210 ($N \cdot C_p$, where N can correspond to the number of individual touch pixel electrodes coupled to the input of the sense channel) of the plurality of individual touch pixel electrodes coupled together and the routing capacitance 1208 ($C_r$) between the touch pixel electrodes and the sense amplifier 1204 input. The sense amplifier can create a dominant pole and the input loading from the plurality of individual touch pixel electrodes ($N \cdot C_p$) can create a second pole. In addition, the variable resistance circuit 1220 can introduce a zero at approximately $1/N \cdot C_p \cdot R_{stb}$, where $R_{stb}$ can correspond to the equivalent resistance of the variable resistance circuit (i.e., the resistance of the adjustable stability resistor). Introducing a zero into the system can stabilize sense amplifier when capacitive loading of N touch pixel electrodes can be large.

Figure 13:
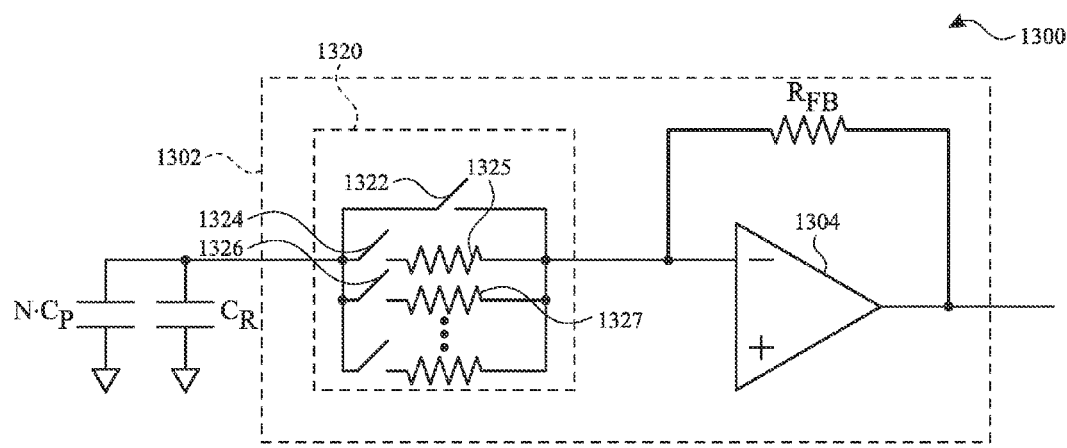
FIG. 13 illustrates another example circuit for a sense channel including a variable resistance circuit and one or more individual pixel electrodes according to examples of the disclosure.

In some examples, the adjustable resistors described above can be implemented using a network of resistors. FIG. 13 illustrates another example circuit for a sense channel including a variable resistance circuit and one or more individual pixel electrode according to examples of the disclosure. Circuit 1300 includes a sense channel 1302 including a sense amplifier 1304 and a feedback network between the inverting input and the output of sense amplifier 1304. Sense channel 1302 can also include a variable resistance circuit 1320 in the input path (in series) between the individual pixel electrode and the input to sense amplifier 1204. Variable resistance circuit 1320 can, for example, include a network of resistors and switches. Although not shown, variable resistance circuit 1320 can be controlled by the channel scan logic 210 in touch controller 206, for example. The equivalent resistance of the variable resistance circuit 1320 can be adjusted based on the settings of the switches in the network. For example, opening all switches except for switch 1322 can result in an equivalent resistance of zero, opening all switches except for switch 1324 can result in an equivalent resistance corresponding the resistance of resistor 1325, and opening all switches except switches 1324 and 1326 can result in an equivalent resistance of the parallel combination of resistors 1325 and 1327. Various combinations of resistors can be generated from the network. Although not shown, the network can also include additional switches and resistors (series and/or parallel) for combination to generate the appropriate equivalent resistance. The equivalent resistance of variable resistance circuit 1320 can be set based on mode of operation and/or the number of electrodes coupled to the sense channel and/or a an estimate of the capacitive loading of the one or more electrodes. The appropriate equivalent resistance of the variable resistance circuit can be tuned empirically or set based on one or more values from a look-up table, for example, to satisfy stability conditions for the sense amplifier. In some examples, the resistance of the adjustable stability resistor can be set to zero (minimized) unless a threshold input capacitance or threshold number of electrodes is coupled to the sense channel. Once the threshold is exceeded, the resistance can be adjusted or scaled upward according to the number of electrodes or input capacitance.

Figure 14:
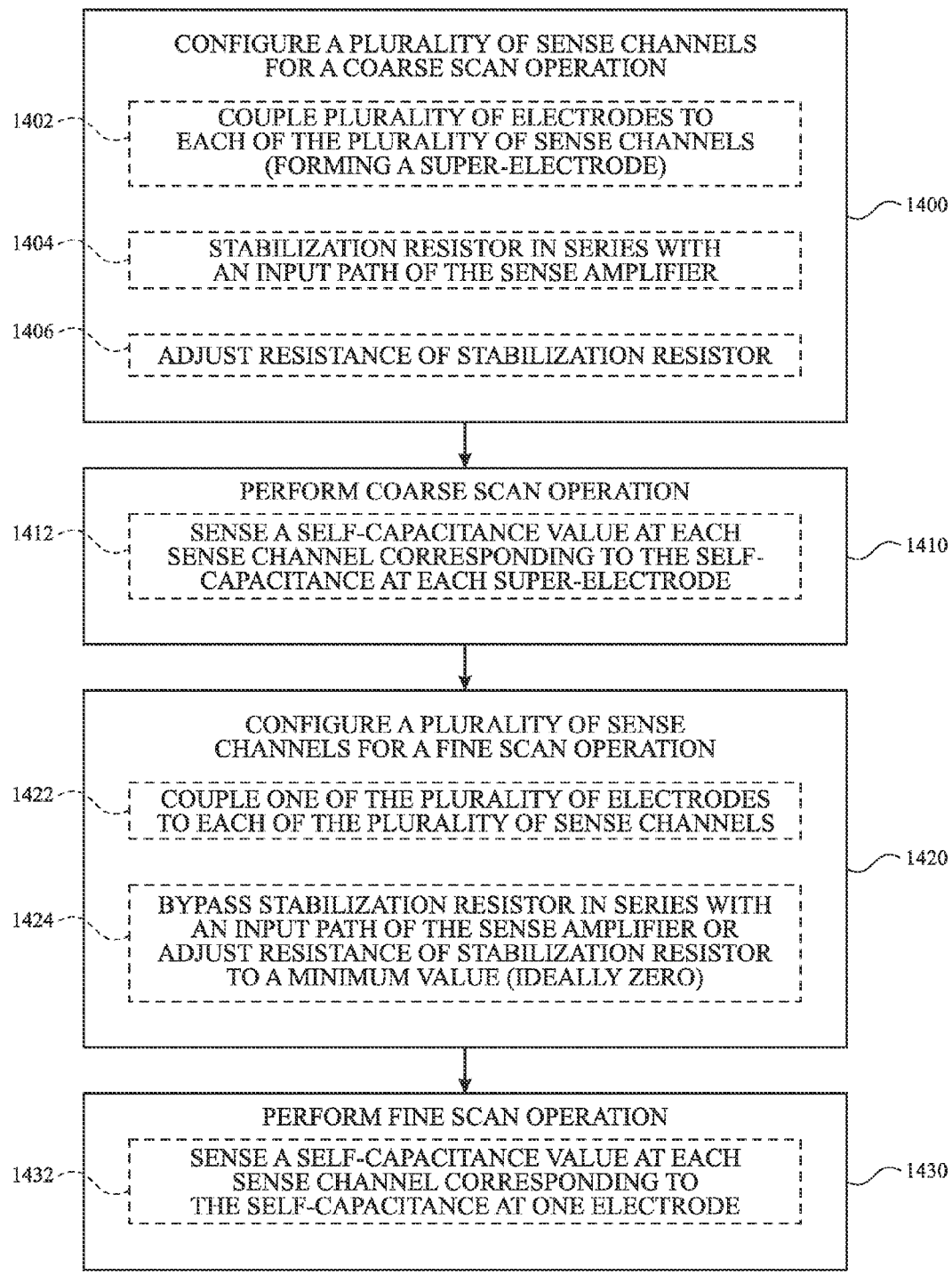
FIG. 14 illustrates an example process for maintaining stability of a sense amplifier when performing scanning operations for a pixelated self-capacitance touch sensor panel according to examples of the disclosure.

FIG. 14 illustrates an example process for maintaining stability of a sense amplifier when performing scanning operations for a pixelated self-capacitance touch sensor panel according to examples of the disclosure. The process can include a coarse scanning operation and a fine scanning operation. The system can configure a plurality of sense channels for a coarse scan operation (1400). In some examples, configuring the plurality of sense channels of a touch sensor panel can include coupling a plurality of electrodes to each of the plurality of sense channels (1402). In some examples, coupling together a plurality of individual touch pixel electrodes forming a super-electrode can allow the system to identify a coarse location of an object touching or in proximity to the touch sensor panel. A stabilization resistance can be adjusted in the input path of sense amplifiers in the sense channels to stabilize the sense amplifier to handle the increased capacitive loading of the plurality of touch pixel electrodes (1404). In some examples, a switch and resistor in parallel (e.g., switchable resistor) can be in series between the touch pixel electrodes and the sense amplifier, and adjusting the stabilization resistance in the input path can include opening the switch such that the series resistor can introduce a zero in the circuit transfer function to offset the effects of the pole from the increased input capacitive loading. In other examples, an adjustable series resistor (or an adjustable series network) can be adjusted to have a series resistance to stabilize the amplifier (1406). The settings of the switch of the switchable resistor and the resistance of the adjustable resistor (or resistor network) can be controlled by the touch system to stabilize the sense amplifier for a coarse scan. The system can perform a coarse scan operation for scanning the sense channels to detect touch or proximity events (1410). The coarse scanning operation can include sensing a self-capacitance value at each sense channel corresponding to the self-capacitance at each super-pixel electrode (1412). The coarse scanning operation can generate touch information (which can be viewed as an image of touch) to identify the coarse location of an object touching or proximate to the touch screen. The system can configure the plurality of sense channels for a fine scan operation (1420). In some examples, each sense channel can be coupled to one individual touch pixel electrode or a number of touch pixel electrodes configured as a row or column of touch pixel electrodes (1422). In some examples, for a fine scan, the sense amplifier can be stable without any series resistance. Thus, in some examples, the system can bypass stabilization resistor in series with an input path of the sense amplifier (e.g., by closing the switch of the switchable resistor) or adjust the resistance of stabilization resistor to a minimum value (ideally zero for an individual touch pixel electrode) (1424). The system can perform the fine scan operation for scanning the selected individual pixel electrodes (or rows or columns of individual pixel electrodes) at or proximate to the coarsely detected location to detect touch or proximity events with more accuracy (1430). The fine scanning operation can include sensing a self-capacitance value at each sense channel corresponding to the self-capacitance at each of the coupled individual pixels (or rows or columns of individual touch pixel electrodes) (1432). The fine scanning operation can generate touch information (which can be viewed as an image of touch) to identify the fine location of an object touching or proximate to the touch screen. Performing a coarse scan and a targeted fine scan to detect the presence of an object can reduce the number of required sense channels compared with only performing full panel individual touch pixel scans.

Therefore, according to the above, some examples of the disclosure are directed to a touch sensing apparatus. The touch sensing apparatus can comprise a sense channel configured to receive input from one or more electrodes. The sense channel can include a sense amplifier and a variable resistance circuit. The variable resistance circuit can be coupled to an input of the sense amplifier and in series with the sense amplifier. The apparatus can further comprise logic configured to couple the sense channel to the one or more electrodes and adjust an effective resistance of the variable resistance circuit to satisfy one or more stability conditions for the sense amplifier. Additionally or alternatively to one or more of the examples disclosed above, in some examples, the logic can be further configured to, in a first sensing mode, couple the sense channel to a plurality of electrodes and adjust the effective resistance of the variable resistance circuit to satisfy the one or more stability conditions for the sense amplifier. Additionally or alternatively to one or more of the examples disclosed above, in some examples, the logic can be further configured to, in a second sensing mode, couple the sense channel to one electrode and minimize the effective resistance of the variable resistance circuit to satisfy the one or more stability conditions for the sense amplifier. Additionally or alternatively to one or more of the examples disclosed above, in some examples, satisfying the one or more stability conditions can comprise limiting a phase shift of a transfer function representing a circuit comprising the sense amplifier and the capacitive loading of the one or more coupled electrodes to within a threshold phase margin of 180 degrees of phase shift for a unity gain bandwidth of the sense amplifier. Additionally or alternatively to one or more of the examples disclosed above, in some examples, adjusting the effective resistance of the variable resistance circuit to satisfy the one or more stability conditions for the sense amplifier can comprise increasing the effective resistance of the variable resistance circuit to introduce a zero in a transfer function of a circuit including the sense amplifier and the one or more electrodes to stabilize the sense amplifier due to the effects of increased input capacitance from the one or more electrodes on a pole of the transfer function. Additionally or alternatively to one or more of the examples disclosed above, in some examples, the resistance of the variable resistance circuit can be adjusted based on a parameter from a look-up table based on a number of the one or more electrodes or an estimated input capacitance from the one or more electrodes. Additionally or alternatively to one or more of the examples disclosed above, in some examples, the variable resistance circuit can comprise a switch and a resistor, and dynamically adjusting the variable resistance circuit can comprise closing the switch to bypass the resistor. Additionally or alternatively to one or more of the examples disclosed above, in some examples, the variable resistance circuit comprises a plurality of resistors and switches, and dynamically adjusting the variable resistance of the circuit can comprise configuring the plurality of switches to generate a desired equivalent resistance. Additionally or alternatively to one or more of the examples disclosed above, in some examples, the variable resistance circuit can comprise a variable resistor. Additionally or alternatively to one or more of the examples disclosed above, in some examples, the effective resistance of the variable resistance circuit can be zero when a number of electrodes coupled to the sense channel is below a threshold number of electrodes and can be adjusted above zero and corresponding to the number of electrodes coupled to the sense channel when the number of electrodes coupled to the sense channel meets or exceeds the threshold number of electrodes. Additionally or alternatively to one or more of the examples disclosed above, in some examples, the effective resistance of the variable resistance circuit can be zero when a number of electrodes coupled to the sense channel is one and can be adjusted above zero and corresponding to the number of electrodes coupled to the sense channel when the number of electrodes coupled to the sense channel is greater than one. Additionally or alternatively to one or more of the examples disclosed above, in some examples, the touch sensing apparatus can be incorporated into a touch system comprising a touch sensor panel. The touch sensor panel can include a plurality of electrodes. Each electrode can represent a unique location of the touch sensor panel at which touch or proximity events can be sensed, and each electrode can be electrically isolated from the other electrodes in the touch sensor panel. Additionally or alternatively to one or more of the examples disclosed above, in some examples, the sense channel can be configured to sense a self-capacitance of one or more of the plurality of electrodes of the touch sensor panel.

Some examples of the disclosure are directed to a method for scanning a touch sensor panel. The method can comprise configuring a plurality of sense channels for a coarse scan operation, performing the coarse scan operation, configuring the plurality of sense channels for a fine scan operation, and performing the fine scan operation. Additionally or alternatively to one or more of the examples disclosed above, in some examples, each of the sense channels configured for the coarse scan operation can include an adjustable resistance in series with an input path of the sense amplifier. Additionally or alternatively to one or more of the examples disclosed above, in some examples, the adjustable resistance in series with the input path of the sense amplifier can be reduced for each of the sense channels configured for the fine scan operation. Additionally or alternatively to one or more of the examples disclosed above, in some examples, the touch sensor panel can include electrodes. Each electrode can represent a unique location of the touch sensor panel at which touch or proximity events can be sensed, and each electrode can be electrically isolated from the other electrodes in the touch sensor panel. Additionally or alternatively to one or more of the examples disclosed above, in some examples, configuring the plurality of sense channels for the coarse scan operation can further comprise coupling each of the plurality of sense channels to a plurality of the electrodes and adjusting the adjustable resistance in series with the input path of the sense amplifier in each of the plurality of sense channels to satisfy one or more stability conditions for the sense amplifier. Additionally or alternatively to one or more of the examples disclosed above, in some examples, configuring the plurality of sense channels for the fine scan operation can further comprise coupling the plurality of sense channels to one of the electrodes and adjusting the adjustable resistance in series with the input path of the sense amplifier in each of the plurality of sense channels to satisfy the one or more stability conditions for the sense amplifier. Additionally or alternatively to one or more of the examples disclosed above, in some examples, satisfying the one or more stability conditions can comprise limiting a phase shift of a transfer function representing a circuit comprising the sense amplifier and the capacitive loading of one or more electrodes to within a threshold phase margin of 180 degrees of phase shift for a unity gain bandwidth of the sense amplifier. Additionally or alternatively to one or more of the examples disclosed above, in some examples, adjusting the adjustable resistance to satisfy the one or more stability conditions for the sense amplifier can comprise introducing a zero in a transfer function of a circuit including the sense amplifier and one or more electrodes to stabilize the sense amplifier due to the effects of increased input capacitance from the one or more electrodes on a pole of the transfer function. Additionally or alternatively to one or more of the examples disclosed above, in some examples, the adjustable resistance can be adjusted based on a parameter from a look-up table based on a number of electrodes coupled to the sense channel or an estimated input capacitance from one or more electrodes. Additionally or alternatively to one or more of the examples disclosed above, in some examples, the adjustable resistance can be zero when a number of electrodes coupled to the sense channel is below a threshold number of electrodes and can be adjusted above zero and corresponding to the number of electrodes coupled to the sense channel when the number of electrodes coupled to the sense channel meets or exceeds the threshold number of electrodes. Additionally or alternatively to one or more of the examples disclosed above, in some examples, the adjustable resistance can be zero when a number of electrodes coupled to the sense channel is one and can be adjusted above zero and corresponding to the number of electrodes coupled to the sense channel when the number of electrodes coupled to the sense channel is greater than one.

Some examples of the disclosure are directed to a non-transitory computer readable storage medium. The computer readable medium can contain instructions that, when executed by a processor, can perform a method. The method can comprise configuring a plurality of sense channels for a coarse scan operation, performing the coarse scan operation, configuring the plurality of sense channels for a fine scan operation, and performing the fine scan operation. Additionally or alternatively to one or more of the examples disclosed above, in some examples, each of the sense channels configured for the coarse scan operation can include an adjustable resistance in series with an input path of the sense amplifier. Additionally or alternatively to one or more of the examples disclosed above, in some examples, the adjustable resistance in series with the input path of the sense amplifier can be reduced for each of the sense channels configured for the fine scan operation. Additionally or alternatively to one or more of the examples disclosed above, in some examples, the touch sensor panel can include electrodes. Each electrode can represent a unique location of the touch sensor panel at which touch or proximity events can be sensed, and each electrode can be electrically isolated from the other electrodes in the touch sensor panel. Additionally or alternatively to one or more of the examples disclosed above, in some examples, configuring the plurality of sense channels for the coarse scan operation can further comprise coupling each of the plurality of sense channels to a plurality of the electrodes and adjusting the adjustable resistance in series with the input path of the sense amplifier in each of the plurality of sense channels to satisfy one or more stability conditions for the sense amplifier. Additionally or alternatively to one or more of the examples disclosed above, in some examples, configuring the plurality of sense channels for the fine scan operation can further comprise coupling the plurality of sense channels to one of the electrodes and adjusting the adjustable resistance in series with the input path of the sense amplifier in each of the plurality of sense channels to satisfy the one or more stability conditions for the sense amplifier. Additionally or alternatively to one or more of the examples disclosed above, in some examples, satisfying the one or more stability conditions can comprise limiting a phase shift of a transfer function representing a circuit comprising the sense amplifier and the capacitive loading of one or more electrodes to within a threshold phase margin of 180 degrees of phase shift for a unity gain bandwidth of the sense amplifier. Additionally or alternatively to one or more of the examples disclosed above, in some examples, adjusting the adjustable resistance to satisfy the one or more stability conditions for the sense amplifier can comprise introducing a zero in a transfer function of a circuit including the sense amplifier and one or more electrodes to stabilize the sense amplifier due to the effects of increased input capacitance from the one or more electrodes on a pole of the transfer function. Additionally or alternatively to one or more of the examples disclosed above, in some examples, the adjustable resistance can be adjusted based on a parameter from a look-up table based on a number of electrodes coupled to the sense channel or an estimated input capacitance from one or more electrodes. Additionally or alternatively to one or more of the examples disclosed above, in some examples, the adjustable resistance can be zero when a number of electrodes coupled to the sense channel is below a threshold number of electrodes and can be adjusted above zero and corresponding to the number of electrodes coupled to the sense channel when the number of electrodes coupled to the sense channel meets or exceeds the threshold number of electrodes. Additionally or alternatively to one or more of the examples disclosed above, in some examples, the adjustable resistance can be zero when a number of electrodes coupled to the sense channel is one and can be adjusted above zero and corresponding to the number of electrodes coupled to the sense channel when the number of electrodes coupled to the sense channel is greater than one.

Some examples of the disclosure are directed to a touch sensing apparatus. The touch sensing apparatus can comprise a sense channel configured to receive input from one or more electrodes. The sense channel can comprise a sense amplifier and means for adjusting an input resistance coupled to an input of the sense amplifier and in series with the sense amplifier. The touch sensing apparatus can further comprise means for coupling the sense channel to the one or more electrodes. The touch sensing apparatus can further comprise means for adjusting the input resistance to satisfy one or more stability conditions for the sense amplifier. Additionally or alternatively to one or more of the examples disclosed above, in some examples, means for adjusting an input resistance can include a variable resistance circuit. Additionally or alternatively to one or more of the examples disclosed above, in some examples, means for coupling the sense channel to the one or more electrodes can include switches or multiplexers. Additionally or alternatively to one or more of the examples disclosed above, in some examples, the means for adjusting the input resistance can include logic configured to adjust the input resistance.

Although examples of this disclosure have been fully described with reference to the accompanying drawings, it is to be noted that various changes and modifications will become apparent to those skilled in the art. Such changes and modifications are to be understood as being included within the scope of examples of this disclosure as defined by the appended claims.

The invention claimed is:

1. A touch sensing apparatus comprising:
a sense channel configured to receive input from one or more electrodes, the sense channel comprising a sense amplifier and a variable resistance circuit, the variable resistance circuit coupled to an input of the sense amplifier and in series with the sense amplifier; and
logic configured to:
couple the sense channel to the one or more electrodes, wherein in a first sensing mode, a first number of the one or more electrodes is coupled to the sense channel and in a second sensing mode, a second number of the one or more electrodes is coupled to the sense channel, the second number less than the first number; and
adjust an effective resistance of the variable resistance circuit to satisfy one or more stability conditions for the sense amplifier, wherein in the first sensing mode, the effective resistance of the variable resistance circuit is adjusted in accordance with a first input capacitance of the first number of the one or more electrodes coupled to the sense channel and in the second sensing mode, the effective resistance of the variable resistance circuit is adjusted in accordance with a second input capacitance of the second number of the one or more electrodes.

2. The touch sensing apparatus of claim 1, wherein satisfying the one or more stability conditions comprises limiting a phase shift of a transfer function representing a circuit comprising the sense amplifier and a capacitive loading of the one or more coupled electrodes to within a threshold phase margin of 180 degrees of phase shift for a unity gain bandwidth of the sense amplifier.

3. The touch sensing apparatus of claim 1, wherein adjusting the effective resistance of the variable resistance circuit to satisfy the one or more stability conditions for the sense amplifier comprises increasing the effective resistance of the variable resistance circuit to introduce a zero in a transfer function of a circuit including the sense amplifier and the one or more electrodes to stabilize the sense amplifier due to effects of increased input capacitance from the one or more electrodes on a pole of the transfer function.

4. The touch sensing apparatus of claim 1, wherein the effective resistance of the variable resistance circuit can be adjusted based on a parameter from a look-up table based on a number of the one or more electrodes or an estimated input capacitance from the one or more electrodes.

5. The touch sensing apparatus of claim 1, wherein the variable resistance circuit comprises a switch and a resistor, and dynamically adjusting the variable resistance circuit comprises closing the switch to bypass the resistor.

6. The touch sensing apparatus of claim 1, wherein the variable resistance circuit comprises a plurality of resistors and a plurality switches, and dynamically adjusting the effective resistance of the variable resistance circuit comprises configuring the plurality of switches to generate a desired equivalent resistance.

7. The touch sensing apparatus of claim 1, wherein the variable resistance circuit comprises a variable resistor.

8. The touch sensing apparatus of claim 1, wherein the effective resistance of the variable resistance circuit is zero when a number of electrodes coupled to the sense channel is below a threshold number of electrodes and the effective resistance of the variable resistance circuit is adjusted above zero and corresponding to the number of electrodes coupled to the sense channel when the number of electrodes coupled to the sense channel meets or exceeds the threshold number of electrodes.

9. The touch sensing apparatus of claim 1, wherein the effective resistance of the variable resistance circuit is zero when a number of electrodes coupled to the sense channel is one and the effective resistance of the variable resistance circuit is adjusted above zero and corresponding to the number of electrodes coupled to the sense channel when the number of electrodes coupled to the sense channel is greater than one.

10. The touch sensing apparatus of claim 1, incorporated into a touch system comprising a touch sensor panel, wherein the touch sensor panel includes a plurality of electrodes, each electrode representing a unique location of the touch sensor panel at which touch or proximity events can be sensed, and each electrode being electrically isolated from other electrodes in the touch sensor panel.

11. The touch sensing apparatus of claim 10, wherein the sense channel is configured to sense a self-capacitance of one or more of the plurality of electrodes of the touch sensor panel.

12. A method for scanning a touch sensor panel including electrodes, the method comprising:
    configuring a plurality of sense channels for a coarse scan operation, wherein configuring the plurality of sense channels for the coarse scan operation comprises coupling each of the plurality of sense channels to a first number of the electrodes, wherein each of the sense channels configured for the coarse scan operation includes an adjustable resistance in series with an input path of a sense amplifier;
    performing the coarse scan operation;
    configuring the plurality of sense channels for a fine scan operation, wherein configuring the plurality of sense channels for the fine scan operation comprises coupling each of the plurality of sense channels to a second number of the electrodes, the second number of the electrodes less than the first number of the electrodes, wherein the adjustable resistance in series with the input path of the sense amplifier is reduced for each of the sense channels configured for the fine scan operation in accordance with an input capacitance of the second number of the electrodes coupled thereto; and
    performing the fine scan operation.

13. The method of claim 12, wherein each electrode of the touch sensor panel represents a unique location of the touch sensor panel at which touch or proximity events can be sensed, and each electrode being electrically isolated from other electrodes in the touch sensor panel.

14. The method of claim 13, wherein configuring the plurality of sense channels for the coarse scan operation further comprises adjusting the adjustable resistance in series with the input path of the sense amplifier in each of the plurality of sense channels to satisfy one or more stability conditions for the sense amplifier; and
    wherein configuring the plurality of sense channels for the fine scan operation further comprises adjusting the adjustable resistance in series with the input path of the sense amplifier in each of the plurality of sense channels to satisfy the one or more stability conditions for the sense amplifier.

15. The method of claim 14, wherein satisfying the one or more stability conditions comprises limiting a phase shift of a transfer function representing a circuit comprising the sense amplifier and capacitive loading of one or more electrodes to within a threshold phase margin of 180 degrees of phase shift for a unity gain bandwidth of the sense amplifier.

16. The method of claim 14, wherein adjusting the adjustable resistance to satisfy the one or more stability conditions for the sense amplifier comprises introducing a zero in a transfer function of a circuit including the sense amplifier and one or more electrodes to stabilize the sense amplifier due to effects of increased input capacitance from the one or more electrodes on a pole of the transfer function.

17. The method of claim 14, wherein the adjustable resistance can be adjusted based on a parameter from a look-up table based on a number of electrodes coupled to the sense channel or an estimated input capacitance from one or more electrodes.

18. The method of claim 14, wherein the adjustable resistance is zero when a number of electrodes coupled to the sense channel is below a threshold number of electrodes and the adjustable resistance is adjusted above zero and corresponding to the number of electrodes coupled to the sense channel when the number of electrodes coupled to the sense channel meets or exceeds the threshold number of electrodes.

19. The method claim of claim 14, wherein the adjustable resistance is zero when a number of electrodes coupled to the sense channel is one and the adjustable resistance is adjusted above zero and corresponding to the number of electrodes coupled to the sense channel when the number of electrodes coupled to the sense channel is greater than one.

20. A non-transitory computer readable storage medium containing instructions that, when executed by a processor, can perform a method for scanning a touch sensor panel including electrodes, the method comprising:
    configuring a plurality of sense channels for a coarse scan operation, wherein configuring the plurality of sense channels for the coarse scan operation comprises coupling each of the plurality of sense channels to a first number of the electrodes, wherein each of the sense channels configured for the coarse scan operation includes an adjustable resistance in series with an input path of a sense amplifier;
    performing the coarse scan operation;
    configuring the plurality of sense channels for a fine scan operation, wherein configuring the plurality of sense channels for the fine scan operation comprises coupling each of the plurality of sense channels to a second number of the electrodes, the second number of the electrodes less than the first number of the electrodes, wherein the adjustable resistance in series with the input path of the sense amplifier is reduced for each of the sense channels configured for the fine scan operation in accordance with an input capacitance of the second number of the electrodes coupled thereto; and
    performing the fine scan operation.

21. The non-transitory computer readable storage medium of claim 20, wherein each electrode of the touch sensor panel represents a unique location of the touch sensor panel at which touch or proximity events can be sensed, and each electrode being electrically isolated from other electrodes in the touch sensor panel.

22. The non-transitory computer readable storage medium of claim 21, wherein configuring the plurality of sense channels for the coarse scan operation further comprises adjusting the adjustable resistance in series with the input path of the sense amplifier in each of the plurality of sense channels to satisfy one or more stability conditions for the sense amplifier; and wherein configuring the plurality of sense channels for the fine scan operation further comprises adjusting the adjustable resistance in series with the input path of the sense amplifier in each of the plurality of sense channels to satisfy the one or more stability conditions for the sense amplifier.

23. The non-transitory computer readable storage medium of claim 22, wherein satisfying the one or more stability conditions comprises limiting a phase shift of a transfer function representing a circuit comprising the sense amplifier and capacitive loading of one or more electrodes to within a threshold phase margin of 180 degrees of phase shift for a unity gain bandwidth of the sense amplifier.

24. The non-transitory computer readable storage medium of claim 22, wherein adjusting the adjustable resistance to satisfy the one or more stability conditions for the sense amplifier comprises introducing a zero in a transfer function of a circuit including the sense amplifier and one or more electrodes to stabilize the sense amplifier due to effects of increased input capacitance from the one or more electrodes on a pole of the transfer function.

25. A touch sensing apparatus comprising:
 a sense channel configured to receive input from one or more electrodes, the sense channel comprising a sense amplifier and means for adjusting an input resistance coupled to an input of the sense amplifier and in series with the sense amplifier;
 means for dynamically coupling the sense channel to the one or more electrodes; and
 means for adjusting the input resistance in accordance with an input capacitance of the one or more electrodes coupled to the sense channel to satisfy one or more stability conditions for the sense amplifier.

* * * * *